US012799294B2

(12) United States Patent
Kaneko et al.

(10) Patent No.: US 12,799,294 B2
(45) Date of Patent: Nov. 17, 2026

(54) POROUS BODY AND SOUND-ABSORBING MATERIAL

(71) Applicant: JSP CORPORATION, Chiyoda-ku (JP)

(72) Inventors: Yohei Kaneko, Mie (JP); Hayato Nakamura, Mie (JP)

(73) Assignee: JSP CORPORATION, Chiyoda-ku (JP)

( * ) Notice: Subject to any disclaimer, the term of this patent is extended or adjusted under 35 U.S.C. 154(b) by 483 days.

(21) Appl. No.: 18/553,641

(22) PCT Filed: Mar. 15, 2022

(86) PCT No.: PCT/JP2022/011521
§ 371 (c)(1),
(2) Date: Oct. 2, 2023

(87) PCT Pub. No.: WO2022/215455
PCT Pub. Date: Oct. 13, 2022

(65) Prior Publication Data

US 2024/0199834 A1 Jun. 20, 2024

(30) Foreign Application Priority Data

Apr. 5, 2021 (JP) ................................ 2021-064030
Sep. 30, 2021 (JP) ................................ 2021-160988

(51) Int. Cl.
*C08J 9/228* (2006.01)
*C08F 232/06* (2006.01)
(Continued)

(52) U.S. Cl.
CPC ............ *C08J 9/228* (2013.01); *C08F 232/06* (2013.01); *C08J 9/0061* (2013.01);
(Continued)

(58) Field of Classification Search
CPC .... C08J 9/228; C08J 9/0061; C08J 2201/028; C08J 2345/00; C08J 2201/026;
(Continued)

(56) References Cited

U.S. PATENT DOCUMENTS 5,189,070 A * 2/1993 Brownscombe .......... C08F 2/32
521/64
5,563,179 A 10/1996 Stone et al.
(Continued)

FOREIGN PATENT DOCUMENTS

CN 1498242 A 5/2004
CN 103080230 A 5/2013
(Continued)

OTHER PUBLICATIONS

Translation of JP 2021-127437A. Sep. 2, 2021. (Year: 2021).*
(Continued)

*Primary Examiner* — K. Boyle
(74) *Attorney, Agent, or Firm* — Oblon, McClelland, Maier & Neustadt, L.L.P.

(57) ABSTRACT

A porous body including, as a base resin, a crosslinked polymer obtained by crosslinking a polymer of an acrylic monomer and/or a styrene-based monomer. A storage modulus of the porous body is 5 kPa or more and 2000 kPa or less at 23° C., an apparent density of the porous body is 10 kg/m$^3$ or more and 250 kg/m$^3$ or less, and a molecular weight between crosslinking points of the crosslinked polymer is $1.0 \times 10^4$ or more.

11 Claims, 2 Drawing Sheets

(51) Int. Cl.
*C08J 9/00* (2006.01)
*G10K 11/162* (2006.01)

(52) U.S. Cl.
CPC ....... *G10K 11/162* (2013.01); *C08J 2201/028* (2013.01); *C08J 2345/00* (2013.01)

(58) Field of Classification Search
CPC ............ C08J 2201/0504; C08J 2333/10; C08J 9/283; C08F 232/06; C08F 220/1804; C08F 220/1808; C08F 2/32; C08F 212/08; C08F 212/36; C08F 222/1063; G10K 1/162
See application file for complete search history.

(56) References Cited

U.S. PATENT DOCUMENTS

| | | | |
|---|---|---|---|
| 5,632,737 | A | 5/1997 | Stone et al. |
| 5,786,395 | A | 7/1998 | Stone et al. |
| 5,851,648 | A | 12/1998 | Stone et al. |
| 6,365,642 | B1 | 4/2002 | Dyer et al. |
| 6,376,565 | B1 | 4/2002 | Dyer et al. |
| 2012/0214916 | A1 | 8/2012 | Dube et al. |
| 2013/0224467 | A1 | 8/2013 | Hirao et al. |
| 2015/0111144 | A1 | 4/2015 | Nair et al. |
| 2016/0243277 | A1 | 8/2016 | Cosgriff-Hernandez et al. |
| 2023/0075291 | A1 | 3/2023 | Kaneko et al. |

FOREIGN PATENT DOCUMENTS

| | | | | |
|---|---|---|---|---|
| CN | 104105748 | A | | 10/2014 |
| CN | 105658704 | A | | 6/2016 |
| EP | 2 612 886 | A1 | | 7/2013 |
| EP | 4 083 083 | A1 | | 11/2022 |
| JP | 11-503177 | A | | 3/1999 |
| JP | 2003-514052 | A | | 4/2003 |
| JP | 2004-529212 | A | | 9/2004 |
| JP | 2012-51984 | A | | 3/2012 |
| JP | 2013-120804 | A | | 6/2013 |
| JP | 2021-127436 | A | | 9/2021 |
| JP | 2021127437 | A | * | 9/2021 |
| WO | WO 2021/166947 | A1 | | 8/2021 |

OTHER PUBLICATIONS

Extended European Search Report issued Mar. 3, 2025 in European Patent Application No. 22784440.4, 8 pages.
Combined Chinese Office Action and Search Report issued Oct. 1, 2025 in Chinese Patent Application No. 202280017528.2 (with unedited computer-generated English Translation), 16 pages.
Chinese Office Action issued Mar. 19, 2026 in Chinese Patent Application No. 202280017528.2 (with unedited computer-generated English translation), 10 pages.
International Preliminary Report on Patentability and Written Opinion issued Oct. 10, 2023 in PCT/JP2022/011521 (submitting English translation only) 5 pgs.
Korean Office Action issued Mar. 9, 2026 in Korean Patent Application No. 10-2023-7037937 (with unedited computer-generated English translation), 21 pages.
Japanese Notice of Reasons for Refusal issued Nov. 5, 2024 in Japanese Patent Application No. 2021-064030 with English translation, 6 pgs.
Japanese Notice of Reasons for Refusal issued Jul. 8, 2025 in Japanese Patent Application No. 2021-160988 with English translation, 6 pgs.
International Search Report mailed on Jun. 7, 2022 in PCT/JP2022/011521 filed on Mar. 15, 2022 (3 pages).

* cited by examiner

POROUS BODY AND SOUND-ABSORBING MATERIAL

CROSS REFERENCE TO RELATED APPLICATIONS

This application is a National Stage entry under 35 U.S.C. § 371 of PCT/JP2022/011521, filed on Mar. 15, 2022, and claims priority to Japanese Patent Application No. 2021-064030, filed on Apr. 5, 2021 and Japanese Patent Application No. 2021-160988, filed on Sep. 30, 2021. The entire contents of each are incorporated herein by reference.

TECHNICAL FIELD

The present invention relates to a porous body including, as a base material, a crosslinked polymer obtained by crosslinking a polymer of an acrylic monomer and/or a styrene-based monomer, and more specifically, to a porous body obtained by polymerization of a high internal phase emulsion (that is, a HIPE foam) and a sound-absorbing material.

BACKGROUND ART

There has been conventionally known a method for obtaining a porous body formed of a crosslinked polymer, which is called a HIPE foam or the like, the method including forming a water-in-oil high internal phase emulsion (that is, HIPE) in which an aqueous phase formed of an aqueous liquid such as water is contained in an organic phase containing a vinyl-based monomer, a crosslinking agent, an emulsifier, a polymerization initiator, and the like at a high ratio, and polymerizing the organic phase in the emulsion. This porous body is a polymer reflecting the dispersion form of the organic phase and the aqueous phase and the dispersion shape of the aqueous phase in the high internal phase emulsion during polymerization. Thus, the porous body has a cell structure in which many cells are homogeneously present in the polymer, and has an open-cell structure in which many pores communicating between the cells are formed. Such a porous body is expected to be applied to uses such as absorbents and separation materials.

For example, Patent Literature 1 proposes a flexible HIPE foam (that is, a porous body) of which a density, a glass transition temperature, and a toughness index are adjusted. According to Patent Literature 1, such a porous body is excellent in flexibility and is suitable for an article, for example, a wiping article, and so on.

PRIOR ART LITERATURE

Patent Literature

Patent Literature 1: JP-T-2003-514052

SUMMARY OF INVENTION

Problems to be Solved by Invention

Application of the porous body to various uses such as sound-absorbing materials, damping materials, and cleaning products has been studied, and development of a porous body excellent in flexibility and ductility is desired. For example, because the conventional porous body described in Patent Literature 1 is insufficient in ductility, the porous body cannot be elongated and may be broken with application of large deformation. Further, a porous body to be used as a sound-absorbing material is expected to be developed to have good sound absorbency.

The present invention has been made in view of such a background, and an object of the present invention is to provide a porous body that is flexible and excellent in ductility. Another object of the present invention is to provide a porous body that is applicable as a sound-absorbing material.

Means for Solving Problem

The gist of the present invention is as follows.

[1] A porous body including, as a base resin, a crosslinked polymer obtained by crosslinking a polymer of an acrylic monomer and/or a styrene-based monomer, wherein
a storage modulus of the porous body is 5 kPa or more and 2000 kPa or less at 23° C.,
an apparent density of the porous body is 10 kg/m$^3$ or more and 250 kg/m$^3$ or less, and
a molecular weight between crosslinking points of the crosslinker polymer is 1.0×10$^4$ or more.

[2] The porous body according to [1], wherein a glass transition temperature of the crosslinked polymer is −30° C. or higher, and the molecular weight between crosslinking points of the crosslinked polymer is 1.0×10$^4$ or more and 12×10$^4$ or less.

[3] The porous body according to [1] or [2], wherein a maximum value of a loss tangent tan δ in a temperature-loss tangent tan δ curve measured by performing dynamic viscoelasticity measurement on the porous body under conditions of frequency: 1 Hz, load: 10 mN, and deformation mode: compression is 0.8 or more and 1.6 or less.

[4] The porous body according to any one of [1] to [3], wherein a half width of a tan δ peak showing a maximum value of a loss tangent tan δ in a temperature-loss tangent tan δ curve measured by performing dynamic viscoelasticity measurement on the porous body under conditions of frequency: 1 Hz, load: 10 mN, and deformation mode: compression is 10° C. or more and 25° C. or less.

[5] The porous body according to any one of [1] to [4], wherein the crosslinked polymer is obtained by crosslinking a copolymer of the acrylic monomer and the styrene-based monomer, and the acrylic monomer is an ester of (meth)acrylic acid and an alcohol having 1 to 20 carbon atoms.

[6] The porous body according to any one of [1] to [5], wherein the crosslinked polymer is obtained by crosslinking a polymer of the acrylic monomer and/or the styrene-based monomer with a first crosslinking agent having a functional group equivalent of 130 g/eq or less and a second crosslinking agent having a functional group equivalent of more than 130 g/eq and 5000 g/eq or less, and the functional group equivalent of the second crosslinking agent is larger than the functional group equivalent of the first crosslinking agent by 100 g/eq or more.

[7] The porous body according to any one of [1] to [5], wherein the crosslinked polymer is obtained by crosslinking a polymer of the acrylic monomer and/or the styrene-based monomer with a crosslinking agent having a functional group equivalent of 500 g/eq or more and 3000 g/eq or less, and the crosslinking agent is urethane (meth)acrylate and/or epoxy (meth)acrylate.

[8] The porous body according to any one of [1] to [7], wherein a recovery rate of the porous body after 25% compression at 23° C. is 90% or more.

[9] The porous body according to any one of [1] to [8], wherein a tensile elongation at break of the porous body is 70% or more at 23° C.

[10] The porous body according to any one of [1] to [9], wherein a breaking energy per unit weight of the porous body is 50 mJ/g or more.

[11] A sound-absorbing material including the porous body according to any one of [1] to [10], wherein a peak temperature of a loss tangent tan δ in a temperature-loss tangent tan δ curve measured by performing dynamic viscoelasticity measurement on the porous body under conditions of frequency: 1 Hz, load: 10 mN, and deformation mode: compression is 50° C. or less, and a flow resistance per unit thickness of the porous body at a flow rate of 0.5 mm/s is $7\times10^4$ N·s/m$^4$ or more and $1\times10^6$ N·s/m$^4$ or less when measured in accordance with ISO 9053-1:2018.

Effects of Invention

The porous body has flexibility and excellent ductility, and has excellent durability against large deformation. In addition, the porous body has sound absorbency and thus, it can be used as a sound-absorbing material.

Figure 1:
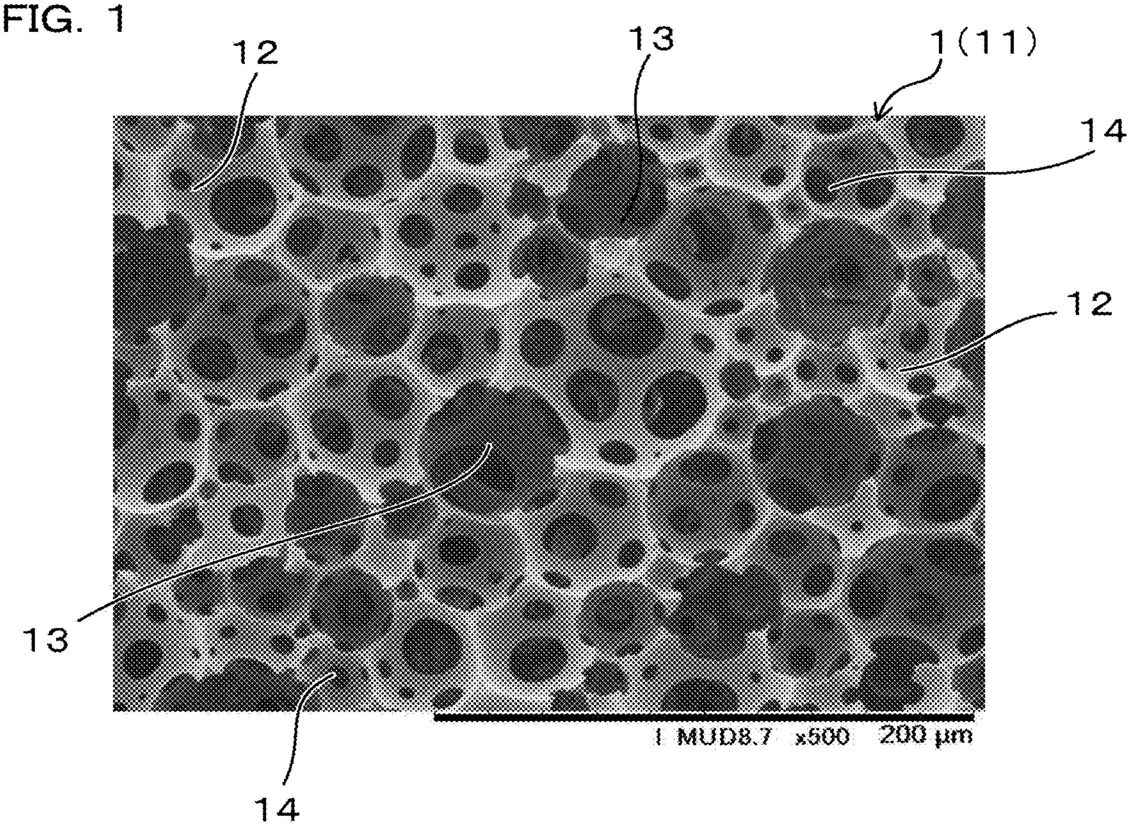
FIG. 1 is a low vacuum scanning electron micrograph of a porous body of Example 1-1.

MODE FOR CARRYING OUT INVENTION (Porous Body)

Hereinafter, a preferred embodiment of the porous body will be described. In the present specification, when numerical values or physical property values are expressed by sandwiching "to", the "to" is used to include the values before and after the "to". When a numerical value or a physical property value is expressed as a lower limit, it is defined that the lower value expressed in such a way is equal to or more than the numerical value or the physical property value, and when an a numerical value or a physical property value is expressed as an upper limit, it is defined that the upper limit expressed in such a way is equal to or less than the numerical value or the physical property value. "Parts by weight" and "wt %" are substantially synonymous with "parts by mass" and "mass %", respectively.

The porous body in the present specification is a porous crosslinked polymer also referred to as a HIPE foam, a polyHIPE foam, a polyHIPE material, a HIPE-derived foam material, a high internal phase emulsion porous body, a high internal phase emulsion foam, or the like. The porous body is obtained, for example, by polymerizing a monomer in a water-in-oil high internal phase emulsion in which an aqueous phase is contained in an organic phase at a high ratio. A high internal phase emulsion is commonly called HIPE. In the following description, the porous body is appropriately referred to as "HIPE foam".

The porous body has an open-cell structure in which many cells are present in the structure and many through holes communicating between adjacent cells are formed.

More specifically, the HIPE foam has many cells, has a crosslinked polymer as a base resin, and has an open-cell structure. A HIPE foam, which is soft, is typically a brittle material, and is recognized as a material having low durability against stress such as friction, tension, or shear. As disclosed in the present specification, adjusting predetermined properties of a HIPE foam provides a HIPE foam that is flexible and excellent in ductility. Further, it is also possible to obtain a HIPE foam that is flexible and excellent in ductility and recoverability.

The HIPE foam is, for example, a porous crosslinked polymer obtained by polymerizing a vinyl-based monomer (specifically, an acrylic monomer and/or a styrene-based monomer) in the presence of a crosslinking agent in a water-in-oil high internal phase emulsion in which an aqueous phase is contained in an organic phase at a high ratio. The HIPE foam includes, as a base resin, for example, a crosslinked polymer containing a component derived from an acrylic monomer and/or a styrene-based monomer obtained by polymerizing the acrylic monomer and/or the styrene-based monomer in a water-in-oil high internal phase emulsion. Specifically, the HIPE foam contains a component derived from an acrylic monomer and/or a styrene-based monomer in the polymer skeleton of a crosslinked polymer. In other words, in the HIPE foam, a crosslinked polymer obtained by crosslinking a polymer of an acrylic monomer and/or a styrene-based monomer is used as a base resin.

It may also be said that the HIPE foam is a porous cured product obtained by curing a high internal phase emulsion, whose cell walls are composed of a crosslinked polymer (for example, a vinyl-based crosslinked polymer). The cell may also be referred to as a pore. The shapes of the cell walls and the cells in the HIPE foam reflect the dispersion form of the organic phase and the aqueous phase and the dispersion shape of the aqueous phase (that is, dispersed phase) in the high internal phase emulsion during polymerization.

In the production process of the HIPE foam, the polymer tends not to be stretched. Thus, the HIPE foam is usually a polymer that hardly causes molecular orientation and has less anisotropy. The HIPE foam can be easily distinguished from foams produced by being stretched at the time of production, such as foams obtained by an extrusion foaming method using an extruder and expanded beads molded articles obtained by in-mold molding of expanded beads obtained by expanding expandable resin particles.

[Cell Structure]

The HIPE foam is a porous body having an open-cell structure as described above. As exemplified in FIG. 1, a HIPE foam 1 has a cell structure in which many cells 13 are homogeneously present in a crosslinked polymer 11 constituting the HIPE foam 1, and also has an open-cell structure in which many through holes 14 penetrating a cell wall 12 and communicating between adjacent cells are formed. In FIG. 1, the cells 13 are portions surrounded by the cell wall 12. The through hole 14 is a hole that penetrates the cell wall 12 and communicates between adjacent cells 13. Specifically, the through hole 14 is a hole that is formed in the cell wall 12 and communicates the adjacent cells 13 with the cell wall 12 interposed therebetween. The through hole 14 may also be referred to as a through window or a connecting hole.

From the viewpoint of further improvement of the recoverability and strength of the HIPE foam, the cells of the HIPE foam preferably have an average diameter of 10 um or more and 200 μm or less. The average diameter of the through holes of the HIPE foam is approximately 1 μm or more and 30 μm or less. Since the through hole is a hole that is generated in the cell wall and communicates between the cells, the through hole diameter is usually smaller than the cell diameter.

The average diameter of the cells is an average value of the equivalent circle diameters of the cells. The equivalent circle diameter of a cell is the diameter of a perfect circle having the same area as the area of the cell in a section of the HIPE foam. The average diameter of the through holes is an average value of the equivalent circle diameters of the through holes. The equivalent circle diameter of a through hole is the diameter of a perfect circle having the same area as the area of the through hole in a section of the HIPE foam. A method for measuring the average diameter of the cells and the average diameter of the through holes will be described later, but for example, the average diameter of the cells and the average diameter of the through holes are measured by performing image analysis on the open-cell structure of the HIPE foam.

When the HIPE foam is used as a sound-absorbing material, the average diameter of the cells of the HIPE foam is preferably 20 μm or more and 160 μm or less. In this case, the sound absorbency of the sound-absorbing material can be more easily improved. The average diameter of the cells of the HIPE foam is preferably 30 μm or more, more preferably 40 μm or more, and still more preferably 50 μm or more, from the viewpoint of enhancing penetration of sound waves into the HIPE foam and facilitating absorption of sound having a relatively high frequency. In addition, from the viewpoint of making it easy for the sound wave that has entered the HIPE foam to collide with the cell wall and making it easy to absorb sound having a relatively low frequency, the average diameter of the cells of the HIPE foam is preferably 150 μm or less, more preferably 140 μm or less, and still more preferably 120 μm or less.

When the HIPE foam is used as a sound-absorbing material, the ratio of the average diameter of the through holes of the HIPE foam to the average diameter of the cells of the HIPE foam is preferably 0.05 or more and 0.5 or less. In this case, the sound absorbency of the sound-absorbing material can be further enhanced in a wide frequency range. From the viewpoint of further enhancing penetration of sound waves into the HIPE foam, the ratio of the average diameter of the through holes of the HIPE foam to the average diameter of the cells of the HIPE foam is more preferably 0.08 or more, and still more preferably 0.1 or more. From the viewpoint of making it easy for the sound wave that has entered the HIPE foam to collide with the cell wall, the ratio of the average diameter of the through holes of the HIPE foam to the average diameter of the cells of the HIPE foam is more preferably 0.4 or less, and still more preferably 0.3 or less. The average diameter of the through holes of the HIPE foam is preferably 5 μm or more and 30 μm or less, more preferably 6 μm or more and 25 μm or less, and still more preferably 8 μm or more and 20 μm or less.

The average diameter of the cells can be controlled by adjusting the water droplet diameter of the aqueous phase (that is, the dispersed phase) of the high internal phase emulsion in the method for producing a HIPE foam described later. For example, by reducing the water droplet diameter, the cell diameter becomes fine, and in the HIPE foam, the average diameter of the cells can be easily adjusted to, for example, 200 μm or less.

In the method for producing a HIPE foam described later, the through hole is formed by breakage of an oil film due to volume shrinkage or the like of a polymer when a monomer is polymerized in a water-in-oil type high internal phase emulsion. The oil film becomes the above-described cell wall with the progress of polymerization and crosslinking. The average diameter of the through holes can be controlled by adjusting the polymerization rate, the composition and viscosity of the organic phase, the stirring power density, and the like in the method for producing a HIPE foam described later.

[Storage Modulus]

The HIPE foam has a storage modulus at 23° C. of 5 kPa or more and 2000 kPa or less. Since the storage modulus is in this range, the HIPE foam has moderate flexibility. For example, the storage modulus of the HIPE foam can be adjusted within the above-described range depending on the application of the porous body. From the viewpoint of further enhancing the flexibility of the HIPE foam, the storage modulus of the HIPE foam at 23° C. is preferably 1000 kPa or less, more preferably 600 kPa or less, still more preferably 500 kPa or less, and particularly preferably 300 kPa or less. From the viewpoint of enhancing the rigidity of the HIPE foam while maintaining the flexibility of the HIPE foam, the storage modulus of the HIPE foam at 23° C. is preferably 10 kPa or more, more preferably 20 kPa or more, still more preferably 30 kPa or more, and particularly preferably 50 kPa or more. A method for measuring the storage modulus will be described later, and the storage modulus is measured by performing dynamic viscoelasticity measurement on the HIPE foam under the conditions of frequency: 1 Hz, load: 10 mN, and deformation mode: compression. In the method for producing a HIPE foam described later, the storage modulus is adjusted to fall within the above-described range by controlling the type and blending ratio of the crosslinking agent, the type and blending ratio of the monomer, the ratio between the organic phase and the aqueous phase, and the like, which are described later.

From the viewpoint that the porous body easily exhibits flexibility even when the porous body is used under a temperature condition lower than normal temperature (for example, 23° C.), the storage modulus at 0° C. is preferably 3000 kPa or less, more preferably 2500 kPa or less, and still more preferably 2000 kPa or less. From the viewpoint of securing ductility and strength of the porous body, the storage modulus at 0° C. is preferably about 50 kPa or more, and more preferably 100 kPa or more.

From the viewpoint of easily exhibiting good physical properties in a wide temperature range from normal temperature to a temperature lower than normal temperature, the ratio of the storage modulus at 0° C. to the storage modulus at 23° C. is preferably 0.005 or more and 0.5 or less, and more preferably 0.01 or more and 0.3 or less.

[Apparent Density]

The HIPE foam has an apparent density of 10 $kg/m^3$ or more and 250 $kg/m^3$ or less. When the apparent density is within this range, the strength, recoverability, and ductility of the HIPE foam can be more easily improved. When the apparent density is too low, the recoverability and strength are likely to decrease, and the porous body may be difficult to handle. On the other hand, when the apparent density is too high, ductility tends to decrease. For example, the apparent density of the HIPE foam can be adjusted within the above-described range depending on the application of the porous body. From the viewpoint of more easily improving the recoverability and strength of the HIPE foam, the apparent density of the HIPE foam is preferably 20 kg/m$^3$ or more, more preferably 30 kg/m$^3$ or more, still more preferably 35 kg/m$^3$ or more, particularly preferably 40 kg/m$^3$ or more, and most preferably 50 kg/m$^3$ or more. From the viewpoint of obtaining a lightweight HIPE foam and further easily improving the ductility of the HIPE foam, the apparent density of the HIPE foam is preferably 200 kg/m$^3$ or less, and more preferably 150 kg/m$^3$ or less.

When the HIPE foam is used as a sound-absorbing material, the apparent density of the HIPE foam is preferably 10 kg/m$^3$ or more and 200 kg/m$^3$ or less from the viewpoint of further improving the sound absorbency of the sound-absorbing material in a wide frequency region. From the viewpoint of further enhancing such an operational effect and enhancing the mechanical strength of the sound-absorbing material, the apparent density of the HIPE foam is more preferably 20 kg/m$^3$ or more, still more preferably 30 kg/m$^3$ or more, particularly preferably 40 kg/m$^3$ or more, and most preferably 45 kg/m$^3$ or more. From the viewpoint of further enhancing the lightness of the sound-absorbing material while securing excellent sound absorbency, the apparent density of the HIPE foam is more preferably 180 kg/m$^3$ or less, still more preferably 150 kg/m$^3$ or less, and particularly preferably 120 kg/m$^3$ or less.

The apparent density p of the HIPE foam is calculated by dividing the weight of the HIPE foam by the volume of the HIPE foam. The volume of the HIPE foam can be calculated based on the external dimensions of the HIPE foam.

The apparent density p of the HIPE foam is adjusted to fall within the above-described range by adjusting the ratio of the total amount of the vinyl-based monomer, the crosslinking agent, an emulsifier, and a polymerization initiator to the amount of the aqueous phase (specifically, the aqueous liquid) in the method for producing a HIPE foam described later.

Molecular Weight between Crosslinking Points

The molecular weight Mc between crosslinking points is an index of the degree of crosslinking of the crosslinked polymer constituting the HIPE foam. The crosslinked polymer has a molecular weight between crosslinking points of 1.0×10$^4$ or more. Since the molecular weight between crosslinking points is within this range, the HIPE foam has excellent ductility. When the molecular weight between crosslinking points is too low, the degree of crosslinking becomes excessively high, and the ductility of the HIPE foam may decrease. From the viewpoint of further improving the ductility of the HIPE foam, the molecular weight between crosslinking points of the crosslinked polymer is preferably 2.0×10$^4$ or more, more preferably 2.5×10$^4$ or more, and still more preferably 3.0×10$^4$ or more. From the viewpoint of further improving the recoverability of the HIPE foam while ensuring excellent ductility, the molecular weight between crosslinking points of the crosslinked polymer is preferably 12×10$^4$ or less, more preferably 10×10$^4$ or less, still more preferably 8.0×10$^4$ or less, and particularly preferably 6.0×10$^4$ or less.

When the HIPE foam is used as a sound-absorbing material, the molecular weight between crosslinking points of the crosslinked polymer may be 1.0×10$^4$ or more and 30×10$^4$ or less. In this case, the mechanical properties such as ductility and recoverability of the HIPE foam can be adjusted to fall within a range suitable as a sound-absorbing material, and the handleability of the sound-absorbing material can be improved. From the viewpoint of further improving the ductility of the HIPE foam and further improving the handleability as a sound-absorbing material, the molecular weight between crosslinking points of the crosslinked polymer is more preferably 2.0×10$^4$ or more, still more preferably 2.5×10$^4$ or more, and particularly preferably 3.0×10$^4$ or more. From the viewpoint of enhancing the recoverability of the HIPE foam and further improving the handleability as a sound-absorbing material, the molecular weight between crosslinking points of the crosslinked polymer is more preferably 25×10$^4$ or less, and still more preferably 20×10$^4$ or less.

The molecular weight Mc between crosslinking points of the crosslinked polymer constituting the HIPE foam is measured as follows. The HIPE foam is subjected to dynamic viscoelasticity measurement (DMA: Dynamic Mechanical Analysis) under the conditions of frequency: 1 Hz, load: 10 mN, deformation mode: compression. In a heating process of the dynamic viscoelasticity measurement, a temperature-storage modulus E' curve (hereinafter, also referred to as a "T-E' curve") obtained by plotting the temperature on the horizontal axis and the storage modulus E' on the vertical axis shows a relatively flat shape until the temperature of the HIPE foam exceeds a glass transition temperature Tg. When the temperature of the HIPE foam rises to around the glass transition temperature Tg, the crosslinked polymer constituting the HIPE foam transitions from a glass state to a rubber state. Thus, in the T-E' curve, the storage modulus E' rapidly decreases with the glass transition temperature Tg as a boundary (see FIG. 2). Thereafter, the T-E' curve shows a plateau region (rubber-like flat portion). Since E' is proportional to the temperature in this plateau region, the molecular weight Mc between crosslinking points can be calculated from the following Formula (I).

$$Mc = 2(1+\mu)\rho RT/E' \tag{I}$$

In Formula (I), μ is Poisson's ratio and μ=0.5 holds. p is the apparent density of the HIPE foam (unit: kg/m$^3$) and R is the gas constant (8.314 J/(K·mol)). Tis the temperature (unit: K) at any point on the rubber-like flat portion, and E' is the storage modulus (unit: kPa) at the temperature T. From the viewpoint that the molecular weight Mc between crosslinking points can be appropriately calculated, it is preferable that the E' is measured in a temperature range of Tg+50° C. to Tg+80° C. (Tg is the glass transition temperature of the crosslinked polymer constituting the HIPE foam.). Poisson's ratio is a value unique to a material, and is a value obtained by dividing the strain generated in the vertical direction by the strain generated in the parallel direction when a stress is applied to an object and multiplying the obtained value by −1. Theoretically, Poisson's ratio takes a value ranging from −1 to 0.5. In a case where Poisson's ratio is a negative value, it means that the object crushes in the lateral direction when crushing in the longitudinal direction. Conversely, in a case where Poisson's ratio is a positive value, it means that the object extends in the lateral direction when crushing in the longitudinal direction. Under the measurement conditions of the dynamic viscoelasticity measurement, the strain generated in the crosslinked polymer constituting the HIPE foam is extremely small, and it can be considered that no volume change occurs. Thus, the storage modulus E' and the molecular weight Mc between crosslinking points are calculated under a constant volume condition, that is, assuming that Poisson's ratio is 0.5.

The molecular weight Mc between crosslinking points of the crosslinked polymer constituting the HIPE foam can be reduced by blending a crosslinking agent in the method for producing a HIPE foam described later, and is adjusted to fall within the above-described range by adjusting the type and blending ratio of the crosslinking agent, the type and blending ratio of the monomer, and the like described later.

[Glass Transition Temperature Tg]

The crosslinked polymer constituting the HIPE foam preferably has the glass transition temperature Tg of −30° C. or higher. By setting the Tg of the HIPE foam within this range, ductility of the HIPE foam can be further improved. When the Tg is too low, ductility tends to decrease. For example, the Tg of the HIPE foam can be adjusted within the above-described range depending on the ductility required for the application of the porous body. From the viewpoint that the ductility of the HIPE foam can be further improved, the glass transition temperature of the crosslinked polymer is preferably −20° C. or higher, and more preferably −10° C. or higher. From the viewpoint of further improving the flexibility of the HIPE foam at room temperature (specifically, 23° C.), the glass transition temperature is preferably 30° C. or lower, more preferably 20° C. or lower, and still more preferably 10° C. or lower.

When the HIPE foam is used as a sound-absorbing material, the glass transition temperature Tg of the crosslinked polymer constituting the HIPE foam is preferably −60° C. or higher and 30° C. or lower. In this case, the sound absorbency of a sound-absorbing material in a relatively low frequency range can be improved. From the viewpoint of enhancing the strength of the HIPE foam while obtaining the above-described operational effect, the glass transition temperature Tg of the crosslinked polymer is preferably −50° C. or higher, more preferably −40° C. or higher, and still more preferably −30° C. or higher. From the viewpoint of more reliably improving the sound absorbency of the sound-absorbing material in a relatively low frequency range, the glass transition temperature Tg of the crosslinked polymer is preferably 20° C. or lower, more preferably 10° C. or lower, still more preferably 0° C. or lower, and particularly preferably −10° C. or lower.

The glass transition temperature Tg of the crosslinked polymer constituting the HIPE foam is measured by differential scanning calorimetry (DSC) analysis based on JIS K7121:1987. The glass transition temperature is the midpoint glass transition temperature in a DSC curve. As conditioning of a test piece, "(3) Measurement of glass transition temperature after performing definite heat treatment" is adopted.

The glass transition temperature Tg of the crosslinked polymer constituting the HIPE foam is adjusted to fall within the above-described range by adjusting the type of the vinyl-based monomer, the blending ratio of the vinyl-based monomer, the type of the crosslinking agent, the blending ratio of the crosslinking agent, and the like in the method for producing a HIPE foam described later.

[Maximum Value of tan δ]

From the viewpoint of further improving the ductility and recoverability of the HIPE foam, the maximum value of a loss tangent tan δ in a temperature-loss tangent tan δ curve (hereinafter, also referred to as a "T-tan δ curve") of the HIPE foam obtained by performing dynamic viscoelasticity measurement (DMA: Dynamic Mechanical Analysis) is preferably 0.8 or more and 1.6 or less. The loss tangent tan δ is measured by performing dynamic viscoelasticity measurement on the HIPE foam under the conditions of frequency: 1 Hz, load: 10 mN, and deformation mode: compression. In the dynamic viscoelasticity measurement, the heating rate is preferably 10° C./min, and the temperature range is preferably −100 to 120° C.

From the viewpoint of forming a more uniform crosslinked structure in the crosslinked polymer and further improving the ductility of the HIPE foam, the maximum value of the loss tangent tan δ of the HIPE foam is more preferably 0.9 or more, and still more preferably 1.0 or more. From the viewpoint of more reliably forming a crosslinked structure and easily enhancing the recoverability of the HIPE foam, the maximum value of the loss tangent tan δ of the HIPE foam is more preferably 1.5 or less, and still more preferably 1.4 or less.

When the HIPE foam is used as a sound-absorbing material, the maximum value of the loss tangent tan δ of the HIPE foam is preferably 0.4 or more. In this case, the sound absorbency of the sound-absorbing material in a relatively low frequency range can be further enhanced. From the viewpoint of further enhancing such an operational effect, the maximum value of the loss tangent tan δ of the HIPE foam is more preferably 0.5 or more, still more preferably 0.6 or more, particularly preferably 0.7 or more, and most preferably 0.8 or more.

[Half Width of tan δ Peak]

From the viewpoint of further improving the ductility of the HIPE foam and improving the flexibility, a half width of the tan δ peak indicating the maximum value of the loss tangent tan δ in the temperature-loss tangent tan δ curve is preferably 10° C. or more and 25° C. or less. From the viewpoint that a more uniform crosslinked structure is formed in the crosslinked polymer and the ductility of the HIPE foam is further improved, the half width of the tan δ peak is more preferably 23° C. or less, still more preferably 20° C. or less. From the viewpoint of easily enhancing the ductility of the HIPE foam while maintaining the recoverability of the HIPE foam, the half width of the tan δ peak is preferably 12° C. or more, and more preferably 14° C. or more.

When the HIPE foam is used as a sound-absorbing material, the half width of the tan δ peak may be 10° C. or more and 80° C. or less. From the viewpoint of further improving the ductility of the HIPE foam and further improving the handleability as a sound-absorbing material, the half width of the tan δ peak is more preferably 70° C. or less, still more preferably 50° C. or less, and particularly preferably 40° C. or less. From the viewpoint of easily enhancing the ductility of the HIPE foam while maintaining the recoverability of the HIPE foam, the half width of the tan δ peak is more preferably 15° C. or more, and still more preferably 20° C. or more.

Figure 3:
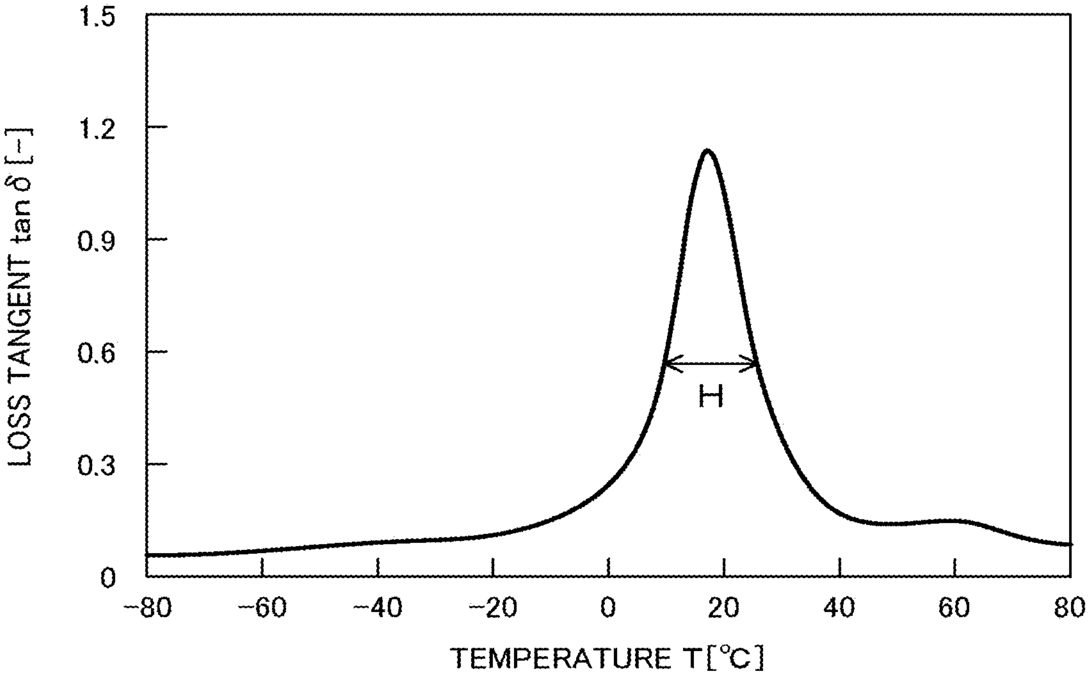
FIG. 3 is a temperature-loss tangent tan δ curve showing a relationship between the temperature T and a loss tangent tan δ of the porous body of Example 1-1.

Details of a method for measuring the maximum value of the loss tangent tan δ and the half width of the tan δ peak will be described later, but the maximum value of the loss tangent tan δ and the half width of the tan δ peak are measured by dynamic viscoelasticity measurement (that is, DMA). FIG. 3 shows an example of the T-tan δ curve of the HIPE foam. In FIG. 3, the vertical axis represents the loss tangent tan δ, and the horizontal axis represents the temperature. The T-tan δ curve has a tan δ peak that maximizes the value of tan δ in the vicinity of the glass transition temperature Tg of the crosslinked polymer constituting the HIPE foam. The half width H of the tan δ peak is the full width at half maximum in the T-tan δ curve, and it means the temperature width of the tan δ peak in a DMA curve, at the position showing the value of the loss tangent tan δ that is half (½) of the maximum value of the tan δ peak in the tan δ peak showing the maximum value of the loss tangent tan δ (that is, the peak top value in the DMA curve represented by the relationship between the temperature T (unit: ° C.) and the loss tangent tan δ) (see FIG. 3).

In general, as the maximum value of the loss tangent tan δ increases, the half width of the corresponding tan δ peak tends to decrease. The maximum value of the loss tangent tan δ is preferably larger, and the half width of the tan δ peak is preferably smaller, from the viewpoint of easily making the HIPE foam flexible even when the temperature around the HIPE foam when the HIPE foam is used is higher than the Tg of the crosslinked polymer but is close to the Tg of the crosslinked polymer.

The maximum value of the loss tangent tan δ and the half width of the tan δ peak are adjusted to fall within the above-described ranges by controlling the type and blending ratio of the crosslinking agent, the type and blending ratio of the monomer, and the like, which will be described later, in the method for producing a HIPE foam described later. The maximum value of the loss tangent tan δ can be increased while the molecular weight between crosslinking points is set within a predetermined range, and the half width of the tan δ peak can be reduced, for example by appropriately containing, in the crosslinked polymer, a soft crosslinking agent component derived from a soft crosslinking agent having a relatively long molecular chain to be described later while not excessively increasing the content of a hard crosslinking agent component to be described later in the crosslinked polymer.

[Peak Temperature of tan δ]

When the HIPE foam is used as a sound-absorbing material, the peak temperature of the loss tangent tan δ in the temperature-loss tangent tan δ curve of the HIPE foam obtained by performing dynamic viscoelasticity measurement is preferably 50° C. or lower. The T-tan δ curve is measured by performing dynamic viscoelasticity measurement on the HIPE foam under the conditions of frequency: 1 Hz, load: 10 mN, and deformation mode: compression. In the dynamic viscoelasticity measurement, the heating rate is preferably 10° C./min, and the temperature range is preferably −100 to 120° C.

As shown in an example in FIG. 3, the T-tan δ curve has a tan δ peak that maximizes the value of tan δ in the vicinity of the glass transition temperature Tg of the crosslinked polymer constituting the HIPE foam. The loss tangent tan δ obtained by dynamic viscoelasticity measurement is a ratio E"/E' of the loss modulus E" to the storage modulus E' of the crosslinked polymer. In the peak temperature of the loss tangent tan δ of the HIPE foam and the temperature range in the vicinity thereof, the value of the loss modulus E" is relatively large with respect to the storage modulus E'. When the value of the ratio E"/E' of the loss modulus E" to the storage modulus E' increases, vibration applied to the crosslinked polymer is easily converted into thermal energy, and the vibration is easily attenuated.

On the other hand, the component having a relatively low frequency among the sound waves propagating in the HIPE foam propagates mainly through the cell wall in the HIPE foam. Therefore, by setting the peak temperature of the loss tangent tan δ of the HIPE foam within the above specific range, it is possible to efficiently attenuate a solid-borne sound in a general use environment (for example, under room temperature conditions at a temperature of 1 to 30° C.) when the HIPE foam is used as a sound-absorbing material. As a result, the sound absorbency of the sound-absorbing material in a relatively low frequency range can be improved.

From the viewpoint of further enhancing such an operational effect, the peak temperature of tan δ of the HIPE foam is preferably 40° C. or lower, more preferably 30° C. or lower, and still more preferably 20° C. or lower. When the peak temperature of tan δ of the HIPE foam is excessively high, attenuation of a solid-borne sound becomes insufficient in a general use environment when the HIPE foam is used as a sound-absorbing material, which may cause deterioration of the sound absorbency of the sound-absorbing material in a relatively low frequency region.

From the viewpoint of enhancing the mechanical strength of the HIPE foam, the peak temperature of tan δ is preferably −60° C. or higher, more preferably −50° C. or higher, still more preferably −40° C. or higher, and particularly preferably −30° C. or higher.

The peak temperature of tan δ can be adjusted to a desired value by controlling the type and blending ratio of the crosslinking agent, the type and blending ratio of the monomer, and the like in the method for producing a HIPE foam. For example, in the crosslinked polymer, the peak temperature of tan δ can be lowered by increasing the content of a component derived from a monomer having an action of lowering the glass transition temperature, such as butyl acrylate. In addition, an increase in the tan δ peak temperature can be curtailed and the tan δ peak temperature can be maintained low, for example by appropriately containing a soft crosslinking agent component to be described later as a crosslinking agent component while not excessively increasing the content of the crosslinking agent component in the crosslinked polymer.

[Recovery Rate after 25% Compression]

A recovery rate of the HIPE foam after 25% compression at 23° C. is preferably 90% or more. In this case, the recoverability of the HIPE foam is sufficiently high, and the HIPE foam is more suitable for applications such as sound-absorbing materials, damping materials, cleaning products, cushion materials, and toys. From the same viewpoint, the recovery rate of the HIPE foam after 25% compression at 23° C. is more preferably 95% or more, still more preferably 98% or more. The upper limit of the recovery rate of the HIPE foam after 25% compression at 23 °C is 100%. The recovery rate after 25% compression is measured in accordance with JIS K6767:1999. Specifically, as will be described later, a sample is allowed to stand for 22 hours in a state of being compressed by 25%, and then the pressure is removed, and the thickness after 30 minutes from the removal of the pressure is measured. Based on the measurement result, the recovery rate is calculated from the calculation formula of thickness after 30 minutes from removal of pressure/thickness before compression×100. The recovery rate after 25% compression at 23° C. is adjusted to fall within the above-described range by controlling the type and blending ratio of the crosslinking agent, the type and blending ratio of the monomer, the ratio between the organic phase and the aqueous phase, and the like, which will be described later, in the method for producing a HIPE foam described later.

[Tensile Elongation at Break]

A tensile elongation at break of the HIPE foam at 23° C. is preferably 70% or more. In this case, the ductility of the HIPE foam becomes sufficiently high, and the HIPE foam can be suitably used for various applications such as sound-absorbing materials, damping materials, cleaning products, cushion materials, and toys. From the same viewpoint, the tensile elongation at break of the HIPE foam at 23° C. is more preferably 75% or more, still more preferably 80% or more, and particularly preferably 100% or more. From the viewpoint of easily enhancing the recoverability of the HIPE foam while maintaining the ductility of the HIPE foam, the tensile elongation at break of the HIPE foam at 23 °C is preferably 500% or less, and more preferably 400% or less. Specifically, the value of the tensile elongation at break at 23° C. is a tensile fracture strain measured by performing a tensile test on a test piece punched into a 1A shape of JIS K7161-2:2014 under the condition of a tensile speed of 100 mm/min according to JIS K7161-2:2014. A method for measuring the tensile elongation at break at 23° C. will be described later. The tensile elongation at break at 23° C. is adjusted to fall within the above-described range by controlling the type and blending ratio of the crosslinking agent, the type and blending ratio of the monomer, the ratio between the organic phase and the aqueous phase, and the like, which will be described later, in the method for producing a HIPE foam described later.

[Breaking Energy per Unit Weight]

The HIPE foam preferably has a breaking energy per unit weight of 50 mJ/g or more. In this case, the strength of the HIPE foam becomes sufficiently high, and the HIPE foam can be suitably used for various applications such as sound-absorbing materials, damping materials, cleaning products, cushion materials, and toys. From the same viewpoint, the breaking energy per unit weight of the HIPE foam is more preferably 60 mJ/g or more, still more preferably 80 mJ/g or more, and still more preferably 100 mJ/g or more. The upper limit of the breaking energy per unit weight of the HIPE foam is not limited as long as the intended purpose of the present invention is achieved, but the upper limit is preferably about 3000 mJ/g, more preferably 2500 mJ/g. A method for measuring the breaking energy per unit weight will be described later. The breaking energy per unit weight is adjusted to fall within the above-described range by controlling the type and blending ratio of the crosslinking agent, the type and blending ratio of the monomer, the ratio between the organic phase and the aqueous phase, and the like, which will be described later, in the method for producing a HIPE foam described later.

[Constituent]

Specifically, the crosslinked polymer constituting the HIPE foam is a polymer of a monofunctional vinyl-based monomer and a crosslinking agent, and has a component derived from the monofunctional vinyl-based monomer. In the present specification, the vinyl-based monomer is a styrene-based monomer, an acrylic monomer, or the like. As the vinyl-based monomer, an acrylic monomer and/or a styrene-based monomer can be used. More specifically, the crosslinked polymer constituting the HIPE foam may have a component derived from an acrylic monomer and a component derived from a crosslinking agent, or may have a component derived from a styrene-based monomer and a component derived from a crosslinking agent. The crosslinked polymer constituting the HIPE foam may have a component derived from an acrylic monomer, a component derived from a styrene-based monomer, and a component derived from a crosslinking agent.

The crosslinked polymer is preferably composed of a polymer of a vinyl-based monomer containing an acrylic monomer and/or a styrene-based monomer and a crosslinking agent. Specifically, the crosslinked polymer preferably has an acrylic monomer component and/or a styrene-based monomer component in the polymer skeleton, and also has a crosslinking agent component to be described later. In this case, the balance between toughness and rigidity of the HIPE foam becomes better. The styrene-based monomer component means a constituent unit derived from a styrene-based monomer in the crosslinked polymer, and the acrylic monomer component means a constituent unit derived from an acrylic monomer in the crosslinked polymer.

From the viewpoint of easily obtaining a HIPE foam having desired physical properties, the proportion of the acrylic monomer component and/or the styrene-based monomer component in the crosslinked polymer is preferably 50 wt % or more, more preferably 60 wt % or more, and still more preferably 70 wt % or more. From the same viewpoint, the proportion of the acrylic monomer component and/or the styrene-based monomer component in the crosslinked polymer is preferably 98 wt % or less, more preferably 96 wt % or less, still more preferably 95 wt % or less, and particularly preferably 90 wt % or less.

Examples of the styrene-based monomer include styrene compounds such as styrene, α-methylstyrene, o-methylstyrene, m-methylstyrene, p-methylstyrene, p-ethylstyrene, 2,4-dimethylstyrene, p-methoxystyrene, p-n-butylstyrene, p-t-butylstyrene, o-chlorostyrene, m-chlorostyrene, p-chlorostyrene, 2,4,6-tribromostyrene, styrenesulfonic acid, and sodium styrenesulfonate. Examples of the acrylic monomer include: acrylic acid esters such as methyl acrylate, ethyl acrylate, propyl acrylate, butyl acrylate, 2-ethylhexyl acrylate, hydroxyethyl acrylate, cyclohexyl acrylate, phenyl acrylate, benzyl acrylate, isobornyl acrylate, dicyclopentanyl acrylate, and adamantyl acrylate; and methacrylic acid esters such as methyl methacrylate, ethyl methacrylate, propyl methacrylate, butyl methacrylate, 2-ethylhexyl methacrylate, hydroxyethyl methacrylate, hydroxypropyl methacrylate, cyclohexyl methacrylate, phenyl methacrylate, benzyl methacrylate, isobornyl methacrylate, dicyclopentanyl methacrylate, and adamantyl methacrylate. Examples of the acrylic monomer also include acrylamide, methacrylamide, and acrylonitrile.

The crosslinked polymer may be composed of a copolymer of a (meth)acrylic acid ester and a crosslinking agent, but is preferably composed of a copolymer of a vinyl-based monomer containing a styrene-based monomer and a (meth) acrylic acid ester and a crosslinking agent. In other words, the crosslinked polymer preferably has a component (that is, a constituent unit) derived from a styrene-based monomer and a (meth)acrylic acid ester in the polymer skeleton. In this case, an HIPE foam composed of a crosslinked polymer having desired physical properties is likely to be obtained.

Since the crosslinked polymer is a polymer that is crosslinked, the crosslinked polymer has a component derived from the crosslinking agent (that is, the constituent unit) in the polymer skeleton. The (meth)acrylic acid ester is an ester of (meth)acrylic acid and an alcohol, and is preferably an ester of (meth)acrylic acid and an alcohol having 1 to 20 carbon atoms.

It is preferable that the HIPE foam contains, as a base resin, a crosslinked polymer obtained by crosslinking a copolymer of an acrylic monomer and a styrene-based monomer, and the acrylic monomer is an ester of (meth) acrylic acid and an alcohol having 1 to 20 carbon atoms. In this case, it is possible to easily obtain a HIPE foam having desired physical properties and to easily adjust the glass transition temperature of the crosslinked polymer to fall within a desired range.

When the vinyl-based monomer contains an acrylic monomer, the proportion of the acrylic monomer in the vinyl-based monomer is preferably 40 wt % or more, more preferably 50 wt % or more, and still more preferably 60 wt % or more. The weight ratio of the acrylic monomer and the styrene-based monomer is preferably 40:60 to 90:10, and more preferably 50:50 to 80:20. In this case, effects of reducing the production cost and facilitating adjustment to desired physical properties are obtained. The (meth)acrylic acid means acrylic acid and/or methacrylic acid.

When the HIPE foam is used as a sound-absorbing material, the content ratio of the acrylic monomer in the vinyl-based monomer is preferably 50 wt % or more, more preferably 60 wt % or more, and still more preferably 70 wt % or more, from the viewpoint of further enhancing the sound absorbency. Similarly, the weight ratio of the acrylic monomer to the styrene-based monomer is preferably acrylic monomer:styrene-based monomer=50:50 to 95:5, and more preferably 60:40 to 90:10. In this case, the content ratio of styrene in the styrene-based monomer is preferably 50 wt % or more, more preferably 60 wt % or more, still more preferably 80 wt % or more, and particularly preferably 90 wt % or more.

From the viewpoint that a crosslinked polymer having excellent physical properties and a desired glass transition temperature can be stably obtained, the number of carbon atoms of the hydrocarbon group constituting the (meth) acrylic acid ester is preferably 1 to 20, more preferably 2 to 18, still more preferably 3 to 16, and even more preferably 4 to 12. The hydrocarbon group is more preferably an alkyl group. The hydrocarbon group may be cyclic or acyclic. Of these, a (meth)acrylic acid ester with a hydrocarbon group having 3 to 10 carbon atoms is preferably used, 2-ethylhexyl acrylate and/or butyl acrylate is more preferably used, and butyl acrylate is still more preferably used. For example, when 2-ethylhexyl acrylate or butyl acrylate is used, the glass transition temperature of the crosslinked polymer can be easily lowered.

When the HIPE foam is used as a sound-absorbing material, the content ratio of the (meth)acrylic acid ester with a hydrocarbon group having 3 to 10 carbon atoms in the acrylic monomer is preferably 50 wt % or more, more preferably 80 wt % or more, and still more preferably 90 wt % or more, from the viewpoint of further enhancing the sound absorbency.

The crosslinked polymer has a crosslinked structure and contains a crosslinking agent component. The crosslinking agent component is a constituent unit derived from the crosslinking agent in the crosslinked polymer. The crosslinking agent is a compound that crosslinks (bonds) between polymer chains constituting a polymer to form a crosslinked structure in the polymer.

As the crosslinking agent, for example, a vinyl-based compound having at least two functional groups selected from a vinyl group and an isopropenyl group in the molecule is used. When the crosslinked polymer contains a predetermined amount of the crosslinking agent component, the rigidity and toughness of the crosslinked polymer can be enhanced, and the value of the molecular weight between crosslinking points of the crosslinked polymer can be reduced. The vinyl-based compound also includes a compound containing a vinyl group and/or an isopropenyl group in the structure of the functional group, such as an acryloyl group and a methacryloyl group. From the viewpoint of stably polymerizing the crosslinking agent, the number of functional groups in the vinyl-based compound is preferably 6 or less, preferably 5 or less, and more preferably 4 or less. From the viewpoint of more easily enhancing the toughness of the crosslinked polymer, the crosslinking agent preferably has functional groups at least at both terminals of the molecule, and more preferably has functional groups only at both terminals of the molecule.

The crosslinked polymer may contain, for example, one type of crosslinking agent component produced using one type of crosslinking agent, but it is preferable to contain a hard crosslinking agent component derived from a hard crosslinking agent having a relatively short molecular chain and a soft crosslinking agent component derived from a soft crosslinking agent having a relatively long molecular chain because it is easy to increase the toughness of the crosslinked polymer while increasing the rigidity of the crosslinked polymer. In this case, the molecular weight Mc between crosslinking points, the storage modulus at a temperature of 23° C., the maximum value of the loss tangent tan δ, and the like of the crosslinked polymer constituting the HIPE foam can be easily adjusted to fall within the above-described ranges. In addition, excessive embrittlement of the HIPE foam is likely to be avoided, and occurrence of chipping or the like in the HIPE foam can be curtailed even when the HIPE foam having a complicated shape such as having a thin portion is produced. The hard crosslinking agent may be referred to as a first crosslinking agent, and the soft crosslinking agent may be referred to as a second crosslinking agent.

The hard crosslinking agent (that is, the first crosslinking agent) is preferably a vinyl-based compound having a functional group equivalent of 130 g/eq or less. Since such a hard crosslinking agent has a relatively short molecular chain, it is considered that the hard crosslinking agent reduces the mobility of the polymer molecular chain by being copolymerized with the vinyl-based monomer. The use of the hard crosslinking agent makes it easy to increase the rigidity of the HIPE foam. From the viewpoint of facilitating the production of the HIPE foam, the lower limit of the functional group equivalent of the hard crosslinking agent is preferably 30 g/eq, more preferably 40 g/eq, still more preferably 50 g/eq, and even more preferably 60 g/eq. The upper limit of the functional group equivalent of the hard crosslinking agent is preferably 120 g/eq. The functional group equivalent of the hard crosslinking agent means the molar mass of the hard crosslinking agent per functional group (specifically, an alkenyl group such as a vinyl group or an isopropenyl group), and the unit of the functional group equivalent may also be expressed as [g/mol].

The soft crosslinking agent (that is, the second crosslinking agent) is preferably a vinyl-based compound having a functional group equivalent of more than 130 g/eq and 5000 g/eq or less. Since such a soft crosslinking agent has a relatively long molecular chain, it is considered that the soft crosslinking agent can crosslink polymer molecular chains by being copolymerized with a vinyl-based monomer without significantly reducing the mobility of the polymer molecular chains. The use of the soft crosslinking agent makes it easy to enhance the toughness of the HIPE foam. From the viewpoint of easy handling, the upper limit of the functional group equivalent of the soft crosslinking agent is preferably 5000 g/eq, more preferably 4000 g/eq, and still more preferably 3000 g/eq. The lower limit of the functional group equivalent of the soft crosslinking agent is preferably 150 g/eq, more preferably 180 g/eq, and still more preferably 200 g/eq. The functional group equivalent of the soft crosslinking agent means the molar mass of the soft crosslinking agent per functional group (specifically, an alkenyl group such as a vinyl group or an isopropenyl group), and the unit of the functional group equivalent may also be expressed as [g/mol].

From the viewpoint of more easily enhancing the toughness and rigidity of the HIPE foam, and from the viewpoint of easily adjusting the maximum value of the loss tangent tan δ and the half width of the tan δ peak to fall within the above-described ranges, the functional group equivalent of the soft crosslinking agent is larger than the functional group equivalent of the hard crosslinking agent preferably by 60 g/eq or more, more preferably by 80 g/eq or more, still more preferably by 100 g/eq or more, and even more preferably by 120 g/eq or more. In other words, the difference between the functional group equivalent of the soft crosslinking agent and the functional group equivalent of the hard crosslinking agent is preferably 60 g/eq or more, more preferably 80 g/eq or more, still more preferably 100 g/eq or more, and even more preferably 120 g/eq or more.

From the viewpoint of further enhancing the polymerization stability and stably and easily obtaining a porous body excellent in rigidity and toughness, the difference between the functional group equivalent of the soft crosslinking agent and the functional group equivalent of the hard crosslinking agent is preferably 3000 g/eq or less, more preferably 2000 g/eq or less, and still more preferably 1000 g/eq or less. When two or more hard crosslinking agents are used, the weight average value of functional group equivalents of all the hard crosslinking agents is calculated, and this value is taken as the functional group equivalent of the hard crosslinking agent. Similarly, when two or more soft crosslinking agents are used, the weight average value of functional group equivalents of all the soft crosslinking agents is calculated, and this value is taken as the functional group equivalent of the soft crosslinking agent.

From the viewpoint of more reliably obtaining the above-described operational effect, it is preferable that the crosslinked polymer contains a component derived from a hard crosslinking agent having a functional group equivalent of 130 g/eq or less and a component derived from a soft crosslinking agent having a functional group equivalent of more than 130 g/eq and 5000 g/eq or less, and the functional group equivalent of the hard crosslinking agent is larger than the functional group equivalent of the soft crosslinking agent by 100 g/eq or more.

Examples of the vinyl-based compound used as the hard crosslinking agent include: divinylbenzene; triallyl isocyanurate; and vinyl-based compounds such as esters of polyhydric alcohols and (meth)acrylic acid. Examples of the ester of a polyhydric alcohol and (meth)acrylic acid include: butanediol (meth)acrylates such as butanediol diacrylate; trimethylolpropane (meth)acrylates such as trimethylolpropane triacrylate; hexanediol (meth)acrylates such as hexanediol diacrylate; vinyl-based compounds such as pentaerythritol (meth)acrylate, for example pentaerythritol tetraacrylate. The number of functional groups in the hard crosslinking agent is two or more. The functional group is preferably a vinyl group and/or an isopropenyl group. These hard crosslinking agents may be used alone, or two or more hard crosslinking agents may be used in combination.

That is, the hard crosslinking agent component constituting the crosslinked polymer may be one or two or more types. From the viewpoint of easily adjusting the rigidity of the HIPE foam, it is preferable to use, as the hard crosslinking agent, a hard crosslinking agent containing divinylbenzene and/or butanediol diacrylate as a main component, and it is more preferable to use a hard crosslinking agent containing divinylbenzene as a main component. The main component of the hard crosslinking agent means a component having a proportion of 50 wt % or more in the hard crosslinking agent. The proportion of the vinyl-based compound as a main component in the hard crosslinking agent is preferably 60 wt % or more, more preferably 80 wt % or more, and still more preferably 90 wt % or more.

Examples of the vinyl-based compound used as the soft crosslinking agent include an ester of a polyhydric alcohol and (meth)acrylic acid, an ester of polyether glycol and (meth)acrylic acid, an ester of a urethane oligomer and (meth)acrylic acid, an ester of an epoxy oligomer and (meth)acrylic acid, and (meth)acrylic-modified silicone. More specifically, examples of the vinyl-based compound include: nonanediol (meth)acrylates such as nonanediol diacrylate; decanediol (meth)acrylates such as decanediol diacrylate; polyethylene glycol (meth)acrylate such as polyethylene glycol diacrylate; polypropylene (meth)acrylates such as polypropylene glycol diacrylate; polytetramethylene glycol (meth)acrylates such as polytetramethylene glycol diacrylate; polyglycerin (meth)acrylates such as polyglycerin diacrylate; urethane (meth)acrylates such as urethane diacrylate; epoxy (meth)acrylates such as epoxy diacrylate; polyester (meth)acrylates such as polyester diacrylate; (meth)acrylic-modified silicones such as both-end (meth) acrylic-modified silicone; caprolactone-modified isocyanurates such as caprolactone-modified trisisocyanurate; and ethoxylated bisphenol A (meth)acrylates such as ethoxylated bisphenol A dimethacrylate. The number of functional groups in the soft crosslinking agent is two or more. The functional group is preferably a vinyl group and/or an isopropenyl group. These soft crosslinking agents may be used alone, or two or more soft crosslinking agents may be used in combination. That is, the soft crosslinking agent component constituting the crosslinked polymer may be one or two or more types. Of these, from the viewpoint of easily enhancing the toughness of the HIPE foam, it is preferable to use at least one compound selected from the group consisting of polyethylene glycol (meth)acrylates, urethane (meth)acrylates, epoxy (meth)acrylates, and (meth)acrylic-modified silicones as the soft crosslinking agent.

From the viewpoint of easily adjusting the toughness of the HIPE foam, it is preferable to use a soft crosslinking agent containing polyethylene glycol di(meth)acrylate as a main component as the soft crosslinking agent. The number of repeating constituent units derived from ethylene glycol in the polyethylene glycol di(meth)acrylate is preferably 3 to 23. From the viewpoint of further enhancing the ductility and strength of the HIPE foam, it is preferable to use a soft crosslinking agent having a functional group equivalent of 500 g/eq or more and 3000 g/eq or less, it is more preferable to use a soft crosslinking agent containing a urethane (meth)acrylate and/or an epoxy (meth)acrylate as a main component as the soft crosslinking agent, and it is still more preferable to use a soft crosslinking agent containing an epoxy (meth)acrylate as a main component. The main component of the soft crosslinking agent means a component having a proportion of 50 wt % or more in the soft crosslinking agent. The proportion of the vinyl-based compound as a main component in the soft crosslinking agent is preferably 60 wt % or more, more preferably 80 wt % or more, and still more preferably 90 wt % or more.

The molecular weights of representative crosslinking agents and the molecular weights per functional group (that is, the functional group equivalent) are shown in Table 1.

TABLE 1

| Variety of Crosslinking Agent | Number of Functional group | Molecular Weight Mw | Molecular Weight per Functional Group (g/eq) |
|---|---|---|---|
| DVB (divinylbenzene) | 2 | 130 | 65 |
| BDODA (butane diol diacrylate) | 2 | 198 | 99 |
| TMPTMA(Trimethylol-propanetrimethacrylate) | 3 | 338 | 113 |
| HDODA (Hexanediol Diacrylate) | 2 | 226 | 113 |
| HDODMA (Hexanediol Dimethacrylate) | 2 | 254 | 127 |
| NDODA (Nonanediol Diacrylate) | 2 | 268 | 134 |
| PEGDA (Polyethylene Glycol Diacrylate) | 2 | 508 | 254 |
| PPGDA (Polypropylene Glycol Diacrylate) | 2 | 532 | 266 |
| UDA (Urethane Diacrylate) | 2 | 1500 | 750 |
| EpDA (Epoxy Diacrylate) | 2 | 1500 | 750 |
| Methacryl Modified Silicone (Both-end-modified Type) | 2 | 4800 | 2400 |

When the crosslinked polymer is composed of at least a copolymer of an acrylic monomer, a styrene-based monomer, and a crosslinking agent, the content of the acrylic monomer component in the crosslinked polymer is preferably 30 parts by weight or more and 85 parts by weight or less, more preferably 40 parts by weight or more and 75 parts by weight or less, and still more preferably 45 parts by weight or more and 65 parts by weight or less, with respect to 100 parts by weight of the total of the vinyl-based monomer component and the crosslinking agent component that constitute the crosslinked polymer, from the viewpoint that the molecular weight Mc between crosslinking points and the storage modulus at a temperature of 23° C. can be easily adjusted to fall within the above-described ranges, and from the viewpoint that the balance between toughness and rigidity of the HIPE foam becomes better. From the same viewpoint, the content of the styrene-based monomer component in the crosslinked polymer is preferably 10 parts by weight or more and 50 parts by weight or less, more preferably 15 parts by weight or more and 45 parts by weight or less, and still more preferably 20 parts by weight or more and 40 parts by weight or less, with respect to 100 parts by weight of the total of the vinyl-based monomer component and the crosslinking agent component that constitute the crosslinked polymer. As the acrylic monomer, a (meth) acrylic acid ester with a hydrocarbon group having 3 to 10 carbon atoms is preferably used, and the content ratio of the (meth)acrylic acid ester with a hydrocarbon group having 3 to 10 carbon atoms in the acrylic monomer is preferably 50 wt % or more, more preferably 80 wt % or more, and still more preferably 90 wt % or more.

As the (meth)acrylic acid ester with a hydrocarbon group having 3 to 10 carbon atoms, 2-ethylhexyl acrylate and/or butyl acrylate is preferable, and butyl acrylate is more preferable.

When the HIPE foam is used as a sound-absorbing material, the content of the acrylic monomer component in the crosslinked polymer is preferably 50 parts by weight or more and 95 parts by weight or less, more preferably 60 parts by weight or more and 90 parts by weight or less, and still more preferably 70 parts by weight or more and 85 parts by weight or less, with respect to 100 parts by weight of the total of the vinyl monomer component and the crosslinking agent component that constitute the crosslinked polymer, from the viewpoint that the peak temperature of tan δ can be easily adjusted to fall within the above-described range and from the viewpoint that the balance between toughness and rigidity of the HIPE foam becomes better. From the same viewpoint, the content of the styrene-based monomer component in the crosslinked polymer is preferably 3 parts by weight or more and 45 parts by weight or less, more preferably 5 parts by weight or more and 30 parts by weight or less, and still more preferably 10 parts by weight or more and 25 parts by weight or less, with respect to 100 parts by weight of the total of the vinyl-based monomer component and the crosslinking agent component that constitute the crosslinked polymer.

From the viewpoint of easily adjusting the molecular weight Mc between crosslinking points and the storage modulus at a temperature of 23° C. of the crosslinked polymer to fall within the above-described ranges, the content of the crosslinking agent component (specifically, the total content of the soft crosslinking agent component and the hard crosslinking agent component in the crosslinked polymer) in the crosslinked polymer is preferably 5 parts by weight or more and 40 parts by weight or less, more preferably 6 parts by weight or more and 35 parts by weight or less, and still more preferably 10 parts by weight or more and 30 parts by weight or less, with respect to 100 parts by weight of the total of the vinyl-based monomer component and the crosslinking agent component that constitute the crosslinked polymer.

When the HIPE foam is used as a sound-absorbing material, the content of the crosslinking agent component in the crosslinked polymer is preferably 3 parts by weight or more and 40 parts by weight or less, and more preferably 4 parts by weight or more and 35 parts by weight or less, with respect to 100 parts by weight of the total of the vinyl-based monomer component and the crosslinking agent component that constitute the crosslinked polymer, from the viewpoint of easily adjusting the tan δ peak temperature of the crosslinked polymer to fall within a desired range.

When the crosslinked polymer contains a crosslinking agent component having a functional group equivalent of 500 g/eq or more and 3000 g/eq or less, the content of the crosslinking agent component having a functional group equivalent of 500 g/eq or more and 3000 g/eq or less in the crosslinked polymer is preferably 20 parts by weight or more and 40 parts by weight, with respect to 100 parts by weight of the total of the vinyl-based monomer component and the crosslinking agent component that constitute the crosslinked polymer. The crosslinking agent component having a functional group equivalent of 500 g/eq or more and 3000 g/eq or less corresponds to the soft crosslinking agent.

When the crosslinked polymer contains a hard crosslinking agent component and a soft crosslinking agent component, the content of the hard crosslinking agent component in the crosslinked polymer is preferably 1 part by weight or more and 10 parts by weight or less, more preferably 2 parts by weight or more and 6 parts by weight or less, and still more preferably 2 parts by weight or more and 5 parts by weight or less, with respect to 100 parts by weight of the total of the vinyl-based monomer component and the crosslinking agent component that constitute the crosslinked polymer, from the viewpoint of easily enhancing the rigidity of the HIPE foam and easily adjusting the molecular weight Mc between crosslinking points and the storage modulus at a temperature of 23° C. to fall within the above ranges. From the viewpoint of easily adjusting the molecular weight Mc between crosslinking points and the storage modulus at a temperature of 23° C. to fall within the above-described ranges while avoiding excessive embrittlement of the HIPE foam, the content of the soft crosslinking agent component in the crosslinked polymer is preferably 3 parts by weight or more and 40 parts by weight or less, more preferably 5 parts by weight or more and 35 parts by weight or less, and still more preferably 8 parts by weight or more and 30 parts by weight or less, with respect to 100 parts by weight of the total of the vinyl-based monomer component and the crosslinking agent component that constitute the crosslinked polymer. From the viewpoint of easily adjusting the molecular weight Mc between crosslinking points, the storage modulus at a temperature of 23° C., the maximum value of the loss tangent tan δ, and the like to fall within the above-described ranges, the weight ratio of the hard crosslinking agent component to the soft crosslinking agent component is preferably 0.05 or more and 1.0 or less, more preferably 0.06 or more and 0.6 or less, still more preferably 0.08 or more and 0.5 or less, and particularly preferably 0.1 or more and 0.4 or less.

When the HIPE foam is used as a sound-absorbing material, the content of the hard crosslinking agent component in the crosslinked polymer is preferably 1 part by weight or more and 20 parts by weight or less, more preferably 2 parts by weight or more and 15 parts by weight or less, and still more preferably 3 parts by weight or more and 10 parts by weight or less, with respect to 100 parts by weight of the total of the vinyl-based monomer component and the crosslinking agent component that constitute the crosslinked polymer, from the viewpoint of easily enhancing the rigidity of the HIPE foam and easily adjusting the tan δ peak temperature or the like to fall within a desired range. From the viewpoint of easily adjusting the tan δ peak temperature to fall within a desired range while avoiding excessive embrittlement of the HIPE foam, the content of the soft crosslinking agent component in the crosslinked polymer is preferably 2 parts by weight or more and 40 parts by weight or less, and more preferably 3 parts by weight or more and 35 parts by weight or less, with respect to 100 parts by weight of the total of the vinyl-based monomer component and the crosslinking agent component that constitute the crosslinked polymer. From the same viewpoint, the weight ratio of the hard crosslinking agent component to the soft crosslinking agent component is preferably 0.05 or more and 4 or less, more preferably 0.06 or more and 3 or less, and still more preferably 0.08 or more and 2 or less.

[Production Method]

The HIPE foam is produced by polymerizing a high internal phase emulsion, specifically, by polymerizing a water-in-oil high internal phase emulsion. The organic phase of the water-in-oil high internal phase emulsion is a continuous phase containing a vinyl-based monomer, a crosslinking agent, an emulsifier, a polymerization initiator, and the like, and the aqueous phase is a dispersed phase containing water such as deionized water.

A more preferred aspect (specifically, a first aspect and a second aspect) of the method for producing a HIPE foam (that is, a porous body) is as follows.

The first aspect is a method for producing a porous body by forming a water-in-oil high internal phase emulsion in which an aqueous phase including water is contained in an organic phase including an acrylic monomer and/or a styrene-based monomer, a crosslinking agent, an emulsifier, and a polymerization initiator, and polymerizing the acrylic monomer and/or the styrene-based monomer in the emulsion, wherein the crosslinking agent is a vinyl-based compound having at least two functional groups selected from a vinyl group and an isopropenyl group in a molecule, and contains a first crosslinking agent having a functional group equivalent of 130 g/eq or less and a second crosslinking agent having a functional group equivalent of more than 130 g/eq and 5000 g/eq or less, the functional group equivalent of the second crosslinking agent is larger than the functional group equivalent of the first crosslinking agent by 100 g/eq or more, an addition amount of the crosslinking agent is 5 parts by weight or more and 40 parts by weight or less with respect to 100 parts by weight of a total of the acrylic monomer, the styrene-based monomer, and the crosslinking agent, an addition amount of the second crosslinking agent is 3 parts by weight or more and 40 parts by weight or less with respect to 100 parts by weight of the total of the acrylic monomer, the styrene-based monomer, and the crosslinking agent, and a weight ratio of the first crosslinking agent to a weight of the second crosslinking agent is 0.05 or more and 1.0 or less.

The second aspect is a method for producing a porous body by forming a water-in-oil high internal phase emulsion in which an aqueous phase including water is contained in an organic phase including an acrylic monomer and/or a styrene-based monomer, a crosslinking agent, an emulsifier, and a polymerization initiator, and polymerizing the acrylic monomer and/or the styrene-based monomer in the emulsion, wherein the crosslinking agent is a vinyl-based compound having at least two functional groups selected from a vinyl group and an isopropenyl group in a molecule, and contains a functional group equivalent of 500 g/eq or more and 3000 g/eq or less, and an addition amount of the crosslinking agent is 20 parts by weight or more and 40 parts by weight or less with respect to 100 parts by weight of a total of the acrylic monomer, the styrene-based monomer, and the crosslinking agent.

The description of the type and content of the vinyl-based monomer, the type and content of the crosslinking agent, and the like described above is also appropriately referred to in the method for producing a porous body.

Specifically, the HIPE foam can be produced by performing an emulsification step, a polymerization step, and a drying step as follows.

First, while an oily liquid (organic phase) containing an organic substance such as a vinyl-based monomer, a crosslinking agent, an emulsifier, and a polymerization initiator is stirred, an aqueous liquid (aqueous phase) containing water is added dropwise to the oily liquid to produce a water-in-oil high internal phase emulsion (emulsification step). In the emulsification step, the high internal phase emulsion can be produced by adding the aqueous liquid to the oily liquid in such a manner that the volume ratio of the aqueous phase is, for example, three times or more the volume ratio of the organic phase. The ratio of the aqueous phase contained in the organic phase can be adjusted by the weight ratio between the organic phase and the aqueous phase. The content of the aqueous phase in the high internal phase emulsion is preferably 300 to 3000 parts by weight, more preferably 400 to 2500 parts by weight, and still more preferably 500 to 2000 parts by weight, with respect to 100 parts by weight of the organic phase. Next, the high internal phase emulsion is heated to polymerize the vinyl-based monomer of the organic phase, the crosslinking agent, and the like, thereby obtaining a polymerization product (specifically, a crosslinked polymer containing moisture) (polymerization step). Thereafter, the polymerization product is dried to thereby a HIPE foam composed of a crosslinked polymer is obtained (drying step).

The stirring speed in the emulsification step is not particularly limited, but for example, the stirring power density can be adjusted in a range of 0.01 kW/m$^3$ to 10 kW/m$^3$. From the viewpoint of more easily obtaining the HIPE foam having a desired cell structure, the stirring power density in the emulsification step is more preferably 0.03 to 7 kW/m$^3$. The stirring power density (unit: kW/m$^3$) in the emulsification step can be determined by calculating the power (unit: kW) at the time of stirring from the torque (unit: N·m) and the rotational speed (unit: rpm) of a stirring device used in the emulsification step, and dividing this power by the volume (unit: m$^3$) of the content of the container in the emulsification step.

The method for adding the aqueous liquid to the oily liquid in the emulsification step is not particularly limited, and a method for starting stirring in a state where the oily liquid and the aqueous liquid are charged into a stirring container and then performing emulsification, a method for charging only the oily liquid into a stirring container, then starting stirring, charging the aqueous liquid into the container using a pump or the like under stirring, and then performing emulsification, and the like can be adopted. When the aqueous liquid is charged using a pump or the like, an addition rate of the aqueous liquid is not particularly limited, but can be adjusted, for example, in a range of 10 wt %/min to 1000 wt %/min with respect to 100 wt % of the oily liquid. The addition rate of the aqueous liquid is more preferably 100 to 800 wt %/min, and still more preferably 200 to 600 wt %/min with respect to 100 wt % of the oily liquid (organic phase). Examples of the emulsification method include a batch-type emulsification step of emulsifying using a stirring container equipped with a stirring device or a centrifugal shaker, and a continuous emulsification step of continuously supplying and mixing the oily liquid and the aqueous liquid in a line equipped with a static mixer, a mesh, and the like. The emulsification method is not particularly limited.

The aqueous phase can contain water such as deionized water, a polymerization initiator, an electrolyte, and the like. In the emulsification step, for example, an oily liquid and an aqueous liquid are each produced, and the aqueous liquid is added to the oily liquid under stirring to thereby a high internal phase emulsion is produced. In the emulsification step, additives such as a flame retardant, a flame retardant aid, a light resistance agent, and a colorant can be appropriately added to the aqueous phase and/or the organic phase.

The flame retardant is used to improve the flame retardancy of the HIPE foam. Examples of the flame retardant include: organic compounds containing halogen, phosphorus, nitrogen, silicone, and the like; and inorganic compounds containing metal hydroxides, phosphorus, nitrogen, and the like. The flame retardant may be used in a range with which the effects of the present invention are not impaired. When the flame retardant is blended, the blending amount thereof is preferably 5 to 20 parts by weight with respect to 100 parts by weight of the total of the vinyl-based monomer component and the crosslinking agent component that constitute the crosslinked polymer. From the viewpoint of easily imparting excellent flame retardancy even when added in a small amount, as the flame retardant, a brominated bisphenol-based flame retardant is preferably used, a brominated bisphenol-based flame retardant having a 2,3-dibromo-2-methylpropyl group and/or a brominated bisphenol-based flame retardant having a 2,3-dibromopropyl group is more preferably used, and 2,2-bis(4-(2,3-dibromo-2-methylpropoxy)-3,5-dibromophenyl) propane is still more preferably used.

In addition, a flame retardant aid may be appropriately blended in the HIPE foam for the purpose of improving the flame retardant efficiency. For example, in a case where a halogen-based flame retardant is used, the use of a radical generator such as dicumyl peroxide as a flame retardant aid can promote elimination of halogen in the flame retardant through decomposition of the radical generator, and improvement in flame retardant efficiency can be expected. In addition, in a case where a halogen-based flame retardant is used, the use of an antimony compound such as antimony trioxide as a flame retardant aid can synergistically combine the effect of radical trapping by the halogen-based flame retardant and the effect of air blocking by antimony oxide, and an improvement in flame retardant efficiency can be expected. The flame retardants may be used alone, or two or more types of flame retardants having different flame retardant mechanisms may be used in combination.

The polymerization initiator is used for initiating polymerization of the vinyl-based monomer. As the polymerization initiator, a radical polymerization initiator can be used. Specifically, organic peroxides such as dilauroyl peroxide (LPO), bis(4-t-butylcyclohexyl)peroxydicarbonate (LTCP), 1,1,3,3-tetramethylbutylperoxy-2-ethylhexanoate, di(3,5,5-trimethylhexanoyl)peroxide, t-butylperoxypivaleate, t-hexylperoxypivaleate, t-butylperoxineoheptanoate, t-butylperoxineodecanoate, t-hexylperoxineodecanoate, di(2-ethylhexyl)peroxydicarbonate, 1,1,3,3-tetramethylbutylperoxineodecanoate, and benzoyl peroxide; azo compounds such as 2,2'-azobisisobutyronitrile, 2,2'-azobis(4-methoxy-2,4-dimethylvaleronitrile), 2,2'-azobis(4-dimethylvaleronitrile), dimethyl-2,2'-azobis(2-methylpropionate), and 2,2'-azobis (2-methylbutyronitrile), and the like are used. From the viewpoint of avoiding boiling of water during polymerization, a half-life temperature of the polymerization initiator for one hour is preferably 95° C. or lower, and more preferably 90° C. or lower. From the viewpoint of safety, to curtail the decomposition of the polymerization initiator at room temperature, the half-life temperature of the polymerization initiator for one hour is preferably 50° C. or higher, and more preferably 55° C. or higher.

As the polymerization initiator, one or more types of substances may be used. From the viewpoint that the polymerization time can be shortened without lowering the uniformity of the density of the HIPE foam, it is preferable to use an organic peroxide having a half-life temperature for one hour of 50° C. or higher and lower than 70° C. and an organic peroxide having a half-life temperature for one hour of 70° C. or higher and 90° C. or lower in combination.

The polymerization initiator may be added to the organic phase and/or the aqueous phase. When the polymerization initiator is added to the aqueous phase, a water-soluble polymerization initiator such as 2,2'-azobis(2-(2-imidazoline-2-yl)propane)dihydrochloride, 2,2'-azobis(2-methylpropionamide)dihydrochloride, potassium persulfate, or ammonium persulfate may be used. The addition amount of the polymerization initiator may be, for example, in a range of 0.1 to 5 parts by weight with respect to 100 parts by weight of the total of the vinyl-based monomer and the crosslinking agent.

The emulsifier is used for the formation and stabilization of the high internal phase emulsion. As the emulsifier, for example, a surfactant may be used. Specifically, glycerol esters such as polyglycerin condensed ricinolate, polyglycerin stearate, polyglycerin oleate, polyglycerin laurate, and polyglycerin myristate; sorbitol esters such as sorbitan oleate, sorbitan stearate, sorbitan laurate, sorbitan laurate, and sorbitan palmitate; ethylene glycol sorbitan esters; ethylene glycol esters; copolymers of polyethylene glycol and polypropylene glycol, and the like are used. The addition amount of the emulsifier may be, for example, in a range of 1 to 30 parts by weight with respect to 100 parts by weight of the total of the vinyl-based monomer, the crosslinking agent, and the emulsifier.

The electrolyte is used for imparting ionic strength to the aqueous phase and enhancing the stability of the emulsion. As the electrolyte, a water-soluble electrolyte may be used. Specifically, calcium chloride, sodium chloride, magnesium chloride, sodium acetate, sodium citrate, sodium sulfate, calcium sulfate, magnesium sulfate, sodium dihydrogen phosphate, disodium hydrogen phosphate, and the like are used. The addition amount of the electrolyte may be, for example, in a range of 0.01 to 10 parts by weight with respect to 100 parts by weight of the aqueous liquid.

The polymerization temperature in the polymerization step is adjusted by, for example, the type of the vinyl-based polymer, the type of the polymerization initiator, the type of the crosslinking agent, and the like. The polymerization temperature is, for example, 50° C. to 90° C. From the viewpoint of enhancing the productivity of the HIPE foam and easily obtaining the HIPE foam having a desired cell structure, the polymerization temperature is more preferably 70 to 85° C. When the polymerization temperature is within the above-described range, a polymerization time is preferably 0.5 to 15 hours, more preferably 0.5 to 12 hours, and still more preferably 0.5 to 10 hours.

In the drying step, the crosslinked polymer containing moisture is dried using an oven, a vacuum dryer, a high-frequency/microwave dryer, or the like. When the drying is completed, a portion where water droplets were present in the emulsion before polymerization becomes cells in the dried polymer, and a porous body can be obtained. Before drying, the crosslinked polymer may be dehydrated by being squeezed using, for example, a press machine or the like. The squeezing may be performed at room temperature (for example, 23° C.), but may also be performed, for example, at a temperature equal to or higher than the glass transition temperature of the crosslinked polymer constituting the HIPE foam. In this case, dehydration through squeezing is facilitated, and the drying time can be shortened. The crosslinked polymer may also be dehydrated by centrifugation. In this case as well, the drying time is shortened.

[Sound-Absorbing Material]

Since the porous body is flexible, excellent in ductility, and excellent in recoverability, the porous body is suitable for a wide variety of applications such as damping materials and cleaning products. In addition, since the porous body has sound absorbency, the porous body may also be used as a sound-absorbing material. The porous body obtained by the above-described method may be used as a sound-absorbing material or the like as it is. In addition, a sound-absorbing material or the like having a desired shape may be obtained by subjecting the porous body to cutting processing or the like as necessary.

A preferable aspect of the sound-absorbing material composed of the porous body is as follows.

[12] A sound-absorbing material composed of a porous body including, as a base resin, a crosslinked polymer obtained by crosslinking a polymer of an acrylic monomer and/or a styrene-based monomer, wherein a peak temperature of a loss tangent tan δ in a temperature-loss tangent tan δ curve measured by performing dynamic viscoelasticity measurement on the porous body under conditions of frequency: 1 Hz, load: 10 mN, and deformation mode: compression is 50° C. or lower, and a flow resistance per unit thickness of the porous body at a flow rate of 0.5 mm/s measured based on ISO 9053-1:2018 is $7\times10^4$ N·s/m$^4$ or more and 1×106 N·s/m$^4$ or less.

[13] The sound-absorbing material according to [12], wherein a maximum value of the loss tangent tan δ in the temperature-loss tangent tan δ curve is 0.4 or more.

[14] The sound-absorbing material according to [12] or [13], wherein the crosslinked polymer has a molecular weight between crosslinking points of $1.0\times10^4$ or more and $30\times10^4$ or less.

[15] The sound-absorbing material according to any one of [12] to [14], wherein the porous body includes, as a base resin, a crosslinked polymer obtained by crosslinking a polymer of an acrylic monomer and a styrene-based monomer, and the acrylic monomer contains an ester of (meth)acrylic acid and an alcohol having 1 to 20 carbon atoms.

[16] The sound-absorbing material according to any one of [12] to [15], wherein the porous body has a density of 10 kg/m$^3$ or more and 200 kg/m$^3$ or less.

[17] The sound-absorbing material according to any one of [12] to [16], wherein an average diameter of cells of the porous body is 20 μm or more and 160 μm or less.

[18] The sound-absorbing material according to any one of [12] to [17], wherein a ratio of an average diameter of through holes penetrating a cell wall of the porous body and communicating between adjacent cells to an average diameter of cells of the porous body is 0.05 or more and 0.5 or less.

As a conventional sound-absorbing material made of a porous material, for example, a sound-absorbing material made of polyurethane foam is known. However, the sound-absorbing material made of polyurethane foam has a problem that absorbability of a sound wave having a relatively low frequency of about 500 to 1000 Hz such as road noise of automobiles is low.

On the other hand, the porous body according to to described above can effectively attenuate both a solid-borne sound that propagates through the cell wall of the porous body, and air-borne sound that propagates through air in the porous body. Therefore, a sound-absorbing material made of such a porous body has good sound absorbency in a relatively low frequency region and has excellent sound absorbency in a wide frequency region. In particular, the porous body can be suitably used as a sound-absorbing material for absorbing sound having a frequency of 100 to 5000 Hz. More specifically, the sound-absorbing material composed of the porous body can be suitably used for, for example, automobiles and buildings.

[Flow Resistance]

The porous body preferably has a flow resistance per unit thickness of $7\times10^4$ N·s/m$^4$ or more and $1\times10^6$ N·s/m$^4$ or less at a flow rate of 0.5 mm/s as measured based on ISO 9053-1:2018. The flow resistance described above is a value indicating difficulty for air to flow inside the porous body when air is caused to flow through the porous body. The higher the flow resistance, the more difficult for air to flow inside the porous body.

The difficulty for air to flow inside the porous body when air is caused to flow at a low air speed is correlated with the difficulty of sound wave transmission inside the porous body. Thus, the value of the flow resistance per unit thickness of the porous body is considered to be an index that can appropriately represent the properties of the porous body as a sound-absorbing material. In the calculation of the flow resistance per unit thickness, the flow resistance per unit thickness at a flow rate of 0.5 mm/s may be calculated based on the value of the flow resistance when air is caused to flow through the porous body under the condition of a flow rate of 0.5 mm/s. In addition, from the viewpoint of enhancing the measurement accuracy, the flow resistance when air is caused to flow through the porous body under the condition of a flow rate of 1 to 3 mm/s may be measured, and the flow resistance per unit thickness at a flow rate of 0.5 mm/s may be calculated based on the relationship between each flow rate and the flow resistance, for example.

It is considered that when the flow resistance per unit thickness of the porous body becomes excessively low, the sound wave entering the porous body hardly collides with the cell wall, and attenuation of solid-borne sound with the cell wall becomes insufficient. Thus, in this case, there is a possibility of causing deterioration in sound absorbency in a relatively low frequency range.

When the flow resistance per unit thickness of the porous body is excessively high, it is considered that a sound wave is less likely to enter the porous body, and attenuation of air-borne sound because of viscous resistance, which is generated between the sound wave and the cell wall, or the like becomes insufficient. Thus, in this case, the sound absorbency in a relatively high frequency region may be deteriorated, leading to deterioration of the sound absorbency.

By setting the flow resistance per unit thickness of the porous body within the specific range, it is possible to attenuate both air-borne sound having a relatively high frequency, and solid-borne sound having a relatively low frequency, in sound waves propagating in the porous body in a well-balanced manner. As a result, the sound absorbency in a relatively low frequency range can be improved, and the sound absorbency of the sound-absorbing material can be improved in a wide frequency range.

The flow resistance per unit thickness of the porous body is mainly related to the apparent density and the cell diameter of the porous body, the ratio between the cell diameter and the through hole diameter, and the like. Thus, the flow resistance per unit thickness of the porous body can be adjusted to fall within the specific range by controlling the cell wall and the structure of the cells in the porous body. For example, when the density of the porous body decreases, the proportion of cells in the volume of the porous body increases, and the flow resistance per unit thickness decreases. For example, when the cell diameter of the porous body increases, air easily flows through the cells of the porous body, and the flow resistance per unit thickness decreases.

[Sound Absorbency]

When a normal incidence sound absorption coefficient at 23° C. is measured using the porous body having a thickness of 20 mm, the total normal incidence sound absorption coefficient at a frequency of 125 to 5000 Hz is preferably 8 or more, and more preferably 9 or more. Using a porous body having such sound absorbency as a sound-absorbing material can further enhance the sound absorbency of the sound-absorbing material in a wide frequency range.

When the normal incidence sound absorption coefficient at 23° C. is measured using the porous body having a thickness of 20 mm, the total normal incidence sound absorption coefficient at a frequency of 500 to 1000 Hz is preferably 2.5 or more, and more preferably 3.0 or more. Using a porous body having such sound absorbency as a sound-absorbing material can further enhance the sound absorbency of the sound-absorbing material in a low frequency region. A method for measuring the total normal incidence sound absorption coefficient in each frequency region will be described in Examples.

[Thickness of Sound-Absorbing Material]

The minimum thickness of the sound-absorbing material is preferably 10 mm or more, preferably 15 mm or more, and preferably 20 mm or more. Setting the minimum thickness of the sound-absorbing material to fall within the specific range can exhibit excellent sound absorbency in any portion of the sound-absorbing material. When the sound-absorbing material has a rectangular parallelepiped shape, setting the minimum thickness of the sound-absorbing material to fall within the specific range can further enhance the sound absorbency of the sound-absorbing material. When the sound-absorbing material has a rectangular parallelepiped shape, the maximum thickness of the sound-absorbing material is preferably about 100 mm or less, more preferably 70 mm or less, and still more preferably 50 mm or less from the viewpoint of enhancing the handleability.

EXAMPLES

Hereinafter, Examples and Comparative Examples of the porous body (specifically, the HIPE foam) will be described.

Example 1-1

In this example, a HIPE foam was produced by the following method. First, in a glass container having an internal volume of 3 L and provided with a stirring device with a torque converter, 31 g of styrene and 47.5 g of butyl acrylate as vinyl-based monomers, 4 g of divinylbenzene having a purity of 57 wt % (2.3 g as divinylbenzene) as a hard crosslinking agent (hereinafter, referred to as a first crosslinking agent), 10 g of polyethylene glycol diacrylate (specifically, NK ESTER A-400 manufactured by SHIN-NAKAMURA CHEMICAL Co., Ltd./purity 95 wt %, 9.5 g as polyethylene glycol diacrylate) as a soft crosslinking agent (hereinafter, referred to as a second crosslinking agent), 7.5 g of polyglycerin-condensed ricinolate (specifically, CRS-75 manufactured by Sakamoto Yakuhin Kogyo Co., Ltd.) as an emulsifier, and 1 g of dilauroyl peroxide as a polymerization initiator were charged. These were mixed in the glass container to form an organic phase.

While the organic phase was stirred at a stirring power density of 1.1 kW/$m^3$, 900 g of deionized water was added at a rate of about 450 g/min, and stirring was continued for 10 minutes even after the completion of the addition of the deionized water, whereby a water-in-oil type (that is, W/O type) high internal phase emulsion was prepared. The stirring power density after completion of emulsification was 1.0 kW/$m^3$. The stirring power density (unit: kW/$m^3$) can be obtained by calculating the power (unit: kW) from the torque (unit: N·m) and the rotation speed (unit: rpm) of the stirring device and dividing the power by the volume (unit: $m^3$) of the content.

Then, the stirring power density was reduced to 0.1 kW/$m^3$, an aspirator was connected to the glass container, and the inside of the container was depressurized to remove microbubbles contained in the emulsion. After 10 minutes from the start of the depressurization, stirring was stopped, and the inside of the container was returned to atmospheric pressure.

The contents of the glass container were filled into a container having a length of about 250 mm, a width of about 180 mm, and a depth of about 90 mm, and polymerized in an oven at 70° C. for about 18 hours to obtain a HIPE foam containing water. The HIPE foam was removed from the oven and cooled to room temperature.

After cooling, the HIPE foam was removed from the container, washed with water, dehydrated, and dried in an oven at 85° C. until constant weight. A rectangular parallelepiped HIPE foam composed of a vinyl-based crosslinked polymer was thus obtained. The apparent density of this HIPE foam was 94 g/L (that is, 94 kg/$m^3$).

The charge composition and the like of this example are shown in Table 2. The contents of the various components (the vinyl-based monomer and the crosslinking agent) in the crosslinked polymer can be determined from the blending amounts (for the crosslinking agent, the blending amount excluding impurities) of the various components at the time of charging and the total blending amounts of the vinyl-based monomer component and the crosslinking agent component (excluding impurities).

In the table, the compound names are abbreviated as follows.

St: styrene

BA: butyl acrylate

DVB: divinylbenzene

PEGDA: polyethylene glycol diacrylate

EpDA: epoxy diacrylate (specifically, a both-end acrylic-modified epoxy prepolymer)

PGPR: polyglycerin condensed ricinolate

LPO: dilauroyl peroxide

Examples 1-2 to 1-12 and Comparative Examples 1-1 to 1-4

A HIPE foam was produced in the same manner as in Example 1-1 except that the charge composition was modified as shown in Tables 2 to 4.

As a modification(s) other than the charge composition, in Example 1-2, the stirring power density in the emulsification step was modified to 1.6 kW/$m^3$. In Examples 1-3 and 1-8 and Comparative Example 1-1, the stirring power density in the emulsification step was modified to 0.7 kW/$m^3$. In Example 1-9, the stirring power density in the emulsification step was modified to 7.8 kW/$m^3$. In Example 1-10, the stirring power density in the emulsification step and the defoaming step was modified to 0.03 kW/$m^3$.

[Evaluation]

The following measurement and evaluation were performed for Examples 1-1 to 1-12 and Comparative Examples 1-1 to 1-4. The results are shown in Tables 2 to 4.

(Apparent Density: ρ)

From the HIPE foam produced as described above, three rectangular parallelepiped test pieces having a thickness of 25 mm, a width of 50 mm, and a length of 50 mm were cut out so as to include the center of the HIPE foam and not to include the skin surface, that is, the surface in contact with the container at the time of polymerization. Next, the weight and actual dimension (specifically, the volume) of each test piece were measured. The apparent density of each test piece was calculated by dividing the weight of the test piece by the volume. Then, the arithmetic average value of the apparent densities of the three test pieces was taken as the apparent density ρ of the HIPE foam.

(Glass Transition Temperature: Tg)

Based on JIS K7121:1987, Tg was calculated by differential scanning calorimetry (that is, DSC) analysis. As a measurement apparatus, DSC250 manufactured by TA Instruments Japan Inc. was used. Specifically, first, about 2 mg of a test piece was collected from the vicinity of the center of the HIPE foam. As the condition adjustment of the test piece, "(3) In a case where glass transition temperature is measured after constant heat treatment is performed" was adopted. Specifically, the collected test piece was allowed to stand for 24 hours or longer in a constant temperature and humidity chamber at a temperature of 23° C. and a humidity of 50%. Subsequently, the test piece was heated to a temperature about 30° C. higher than the temperature at the end of the glass transition at a heating rate of 10° C./min, held at this temperature for 10 minutes, and then cooled to a temperature about 50° C. lower than the glass transition temperature at a cooling rate of 10° C./min. For example, in the measurement of Tg of the HIPE foam of Example 1-1, the HIPE foam was heated to 40° C. and then cooled to −45° C. After cooling, the apparatus was stabilized by maintaining this temperature for 10 minutes, and DSC measurement was performed at a heating rate of 20° C./min to a temperature about 30° C. higher than the temperature at the end of glass transition to thereby a DSC curve was obtained. The midpoint glass transition temperature was determined from this DSC curve, and this value was taken as the glass transition temperature Tg. The measurement temperature range in Examples 1-1 to 1-12 and Comparative Examples 1-1 to 1-4 was in a range of −90° C. to 70° C.

(Molecular Weight between Crosslinking Points: Mc)

Figure 2:
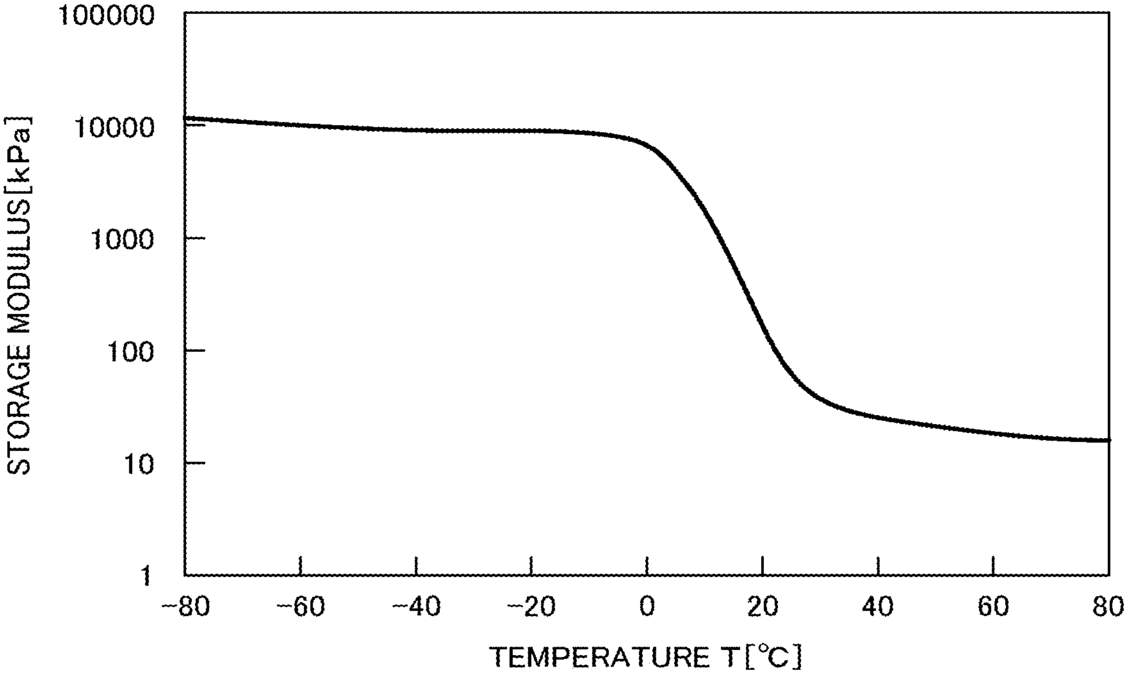
FIG. 2 is a temperature-storage modulus curve showing a relationship between a temperature T and a storage modulus E' of the porous body of Example 1-1.

Three test pieces having a cubic shape of 10 mm×10 mm×10 mm and having no skin surface were cut out from the vicinity of the center of the HIPE foam. The three test pieces were subjected to dynamic viscoelasticity measurement (DMA) to obtain a T-E' curve in a temperature region of −100to 120° C. FIG. 2 shows an example of the T-E' curve of the HIPE foam. The T-E' curve is obtained by plotting the temperature on the horizontal axis and the storage modulus E' on the vertical axis. As a measurement apparatus, DMA7100 manufactured by Hitachi High-Tech Science Corporation was used. The details of the measurement conditions are as follows.

Deformation mode: Compression

Temperature: −100 to 120° C.

Heating rate: 10° C./min

Frequency: 1 Hz

Load: 10 mN

The molecular weight Mc between crosslinking points was calculated from the following Formula (I) by using the storage modulus E' and the temperature T in the rubber-like flat portion measured by dynamic viscoelasticity measurement for the three test pieces. In Examples, three temperatures T randomly selected from a temperature range of Tg+50° C. to Tg+80° C., which correspond to the rubber-like flat portion in each of the T-E' curves of the three test pieces, were selected, and the storage moduli E' at the temperatures T were determined. Next, the molecular weights between crosslinking points at the respective temperatures were calculated from the following Formula (I) by using the storage moduli E' and the temperatures T. Then, the arithmetic average value of the total of nine molecular weights between crosslinking points calculated from the T-E' curves of the three test pieces was adopted as the molecular weight Mc between crosslinking points. Tg is the glass transition temperature of the crosslinked polymer constituting the HIPE foam.

$$Mc = 2(1+\mu)\rho RT/E' \quad (I)$$

Under the measurement conditions of the dynamic viscoelasticity measurement, the strain generated in the crosslinked polymer constituting the HIPE foam is extremely small, and thus it can be considered that no volume change occurs. Therefore, the storage modulus E' and the molecular weight Mc between crosslinking points were calculated under a constant volume condition, that is, the condition of assuming that Poisson's ratio is 0.5.

(Storage Modulus and Storage Modulus Ratio at 0° C. and 23° C.)

The storage modulus at 0° C. and the storage modulus at 23° C. were determined from the storage modulus E' in the temperature region of −100 to 120° C. measured by the dynamic viscoelasticity measurement (DMA). As a representative example, the T-E' curve of the porous body of Example 1-1 is shown in FIG. 2.

In addition, the ratio of the storage modulus at 0° C. to the storage modulus at 23° C. was calculated.

(Maximum Value of Loss Tangent tan δ and Half Width of tan δ Peak)

A T-tan δ curve in the temperature region of −100 to 120° C. was obtained in the same manner as in the measurement of the molecular weight Mc between crosslinking points. The loss tangent tan δ is a value obtained by dividing the loss modulus E" by the storage modulus E', and E', E", and tan δ may be simultaneously obtained in dynamic viscoelasticity measurement. The value of tan δ at the peak top of the tan δ peak in the T-tan δ curve thus obtained was taken as the maximum value of the loss tangent tan δ. In the tan δ peak appearing in the T-tan δ curve, temperatures at two positions where the value of tan δ was ½ of the maximum value were obtained, and the temperature difference between the positions was defined as a half width H. The T-tan δ curve of the HIPE foam of Example 1-1 is shown in FIG. 3.

(Tensile Elongation at Break)

Five samples having a thickness of 4 mm, a length of 50 mm, and a width of 180 mm were cut out from the vicinity of the center of the HIPE foam. With a dumbbell die having a 1A shape (JIS K 7161-2:2014), the sample was punched into a 1A shape to obtain five test pieces. These test pieces were subjected to a tensile test under the following conditions in accordance with JIS K 7161-2:2014 using Autograph AGS-10kNX manufactured by Shimadzu Corporation. From the obtained load-displacement curve, the tensile fracture strain was calculated, and the average value of the five measurement results was taken as the tensile elongation at break.

Room temperature: 23° C.
Humidity: 50%
Tensile speed: 100 mm/min

When the tensile fracture point was 70% or more, the ductility was determined to be good and was described as "Good" in the table. When the tensile fracture point was less than 70%, the ductility was determined to be poor and was described as "Poor" in the table.

(Breaking Energy)

An arithmetic average value of the energy in a region from the strain amount of 0% to the tensile fracture strain in the load-displacement curve measured in the tensile test was calculated. As the breaking energy, a value automatically calculated by Autograph AGS-10kNX was used.

The breaking energy per unit weight of the HIPE foam was calculated, and when the calculated value was 50 mJ/g or more, the strength was determined to be good and was described as "Good" in the table. When the calculated value was less than 50 mJ/g, the strength was determined to be poor and was described as "Poor" in the table.

(Comprehensive Determination)

In the case where the ductility and strength were all good, "Good" is listed in the table. In the case where any one of them was poor, "Poor" is listed in the table.

(Recovery Rate and Compression Set after 30 Minutes and 24 Hours)

A test piece of 25 mm×50 mm×50 mm having no skin surface was cut out from the vicinity of the center of the HIPE foam, and a compression set was measured in accordance with JIS K 6767: 1999 using this test piece. Specifically, under an environment of a temperature of 23° C. and a humidity of 50%, the test piece was compressed in a distorted state by 25% with respect to a thickness of 25 mm, left as it was for 22 hours, and then the pressure was removed. The thickness was measured after 30 minutes and 24 hours from the removal of pressure. The recovery rate (unit: %) and the compression set (unit: %) after 30 minutes and 24 hours from the removal of pressure were calculated from the following calculation formulas.

(Recovery rate after 30 minutes)=(thickness after 30 minutes from removal of pressure)/(original thickness)×100[%]

(Recovery rate after 24 hours)=(thickness after 24 hours from removal of pressure)/(original thickness)×100 [%]

(Compression set)=((original thickness)−(thickness after 24 hours from removal of pressure))/(original thickness)×100[%]

The higher the recovery rate after 30 minutes and/or the recovery rate after 24 hours, the better the recoverability of the HIPE foam. The smaller the compression set, the better the recoverability of the HIPE foam.

TABLE 2

| | | | Example No. | | | | | |
|---|---|---|---|---|---|---|---|---|
| | | | Example 1-1 | Example 1-2 | Example 1-3 | Example 1-4 | Example 1-5 | Example 1-6 |
| Organic Phase (Continuous Phase) | Monomer (Monofunctional) | St [parts by weight] | 31 | 30 | 31 | 27 | 33.5 | 38.5 |
| | | BA [parts by weight] | 47.5 | 46 | 47.5 | 53.5 | 42 | 48 |
| | Crosslinking Agent | DVB [parts by weight] | 4 | 4 | 4 | 7 | 2 | 1 |
| | | PEGDA [parts by weight] | 10 | 10 | 10 | 5 | 15 | 5 |
| | | EpDA [parts by weight] | — | — | — | — | — | — |

TABLE 2-continued

| | | Example No. | | | | | |
|---|---|---|---|---|---|---|---|
| | | Example 1-1 | Example 1-2 | Example 1-3 | Example 1-4 | Example 1-5 | Example 1-6 |
| Emulsifier | PGPR [parts by weight] | 7.5 | 7.5 | 7.5 | 7.5 | 7.5 | 7.5 |
| Polymerization Initiator | LPO [parts by weight] | 1 | 1 | 1 | 1 | 1 | 1 |
| Blending amount of first crosslinking agent excluding impurities with respect to 100 parts by weight of (T)* | | 2.3 | 2.3 | 2.3 | 4.0 | 1.1 | 0.6 |
| Blending amount of second crosslinking agent excluding impurities with respect to 100 parts by weight of (T)* | | 9:5 | 9.5 | 9.5 | 4.8 | 14 | 4.8 |
| Blending amount of first crosslinking agent excluding impurities/ Blending amount of second crosslinking agent excluding impurities | | 0.24 | 0.24 | 0.24 | 0.84 | 0.08 | 0.12 |
| Aqueous Phase (Dispersed Phase) | Water [parts by mass] | 900 | 2400 | 400 | 900 | 900 | 900 |
| Physical Property | Apparent Density [kg/m$^3$] | 94 | 40 | 221 | 97 | 109 | 97 |
| | Tg [°C] | 5.3 | 5.0 | 4.0 | 2.1 | 5.9 | 3.8 |
| | Molecular Weight between Crosslinking Points [×10$^4$] | 5.3 | 6.7 | 3.6 | 2.6 | 7.9 | 12 |
| | Storage Modulus @ 0 °C. [kPa] | 6640 | 1550 | 13100 | 4080 | 3150 | 10400 |
| | Storage Modulus @ 23 °C [kPa] | 80 | 280 | 180 | 135 | 70 | 78 |
| | Storage Modulus Ratio (@ 0 °C/@ 23 °C) [—] | 0.012 | 0.18 | 0.014 | 0.033 | 0.022 | 0.0075 |
| | Maximum Value of tanδ [—] | 1.1 | 1.2 | 1.1 | 0.9 | 1.1 | 1.6 |
| | Half Width of tanδ Peak [°C] | 11 | 18 | 18 | 24 | 15 | 15 |
| | Strain at Tensile Fracture Point [%] | 113 | 141 | 77 | 77 | 127 | 308 |
| | Determination of Ductility (≥70%) | Good | Good | Good | Good | Good | Good |
| | Breaking Energy [mJ] | 119 | 99 | 205 | 69 | 158 | 454 |
| | Breaking Energy per Unit Weight [mJ/g] | 137 | 268 | 101 | 77 | 157 | 507 |
| | Determination of Strength (≥50 mJ/g) | Good | Good | Good | Good | Good | Good |
| | Comprehensive Determination of Durability | Good | Good | Good | Good | Good | Good |
| | Recovery Rate after 30 Minutes [%] | 99.4 | 98.8 | 99.8 | 99.9 | 99.1 | 94.0 |
| | Recovery Rate after 24 Hours [%] | 99.9 | 99.5 | 100.0 | 100.0 | 99.2 | 99.6 |
| | Compression Set after 24 hours [%] | 0.1 | 0.5 | 0.0 | 0.0 | 0.8 | 0.4 |

(T)*: Total amount of a vinyl-based monomer and a crosslinking agent (Blending amount of the crosslinking agent excluding impurities)

TABLE 3

| | | | Example No. | | | | | |
|---|---|---|---|---|---|---|---|---|
| | | | Example 1-7 | Example 1-8 | Example 1-9 | Example 1-10 | Example 1-11 | Example 1-12 |
| Organic Phase (Continuous Phase) | Monomer (Monofunctional) | St [parts by weight] | 18.5 | 42.5 | 22.5 | 29 | 31 | 38 |
| | | BA [parts by weight] | 60 | 36 | 40 | 44.5 | 47.5 | 49 |
| | Crosslinking Agent | DVB [parts by weight] | 4 | 4 | — | 4 | 4 | 0.5 |
| | | PEGDA [parts by weight] | 10 | 10 | — | 10 | 10 | 5 |
| | | EpDA [parts by weight] | — | — | 30 | — | — | — |
| | Emulsifier | PGPR [parts by weight] | 7.5 | 7.5 | 7.5 | 12.5 | 7.5 | 7.5 |
| | Polymerization Initiator | LPO [parts by weight] | 1 | 1 | 1 | 1 | 1 | 1 |
| | Blending amount of first crosslinking agent excluding impurities with respect to 100 parts by weight of (T)* | | 2.3 | 2.3 | 0.0 | 2.3 | 2.3 | 0.3 |
| | Blending amount of second crosslinking agent excluding impurities with respect to 100 parts by weight of (T)* | | 9.5 | 9.5 | 28.5 | 9.5 | 9.5 | 4.8 |
| | Blending amount of first crosslinking agent excluding impurities/ Blending amount of second crosslinking agent excluding impurities | | 0.24 | 0.24 | 0 | 0.24 | 0.24 | 0.06 |
| Aqueous Phase (Dispersed Phase) | | Water [parts by mass] | 900 | 900 | 900 | 900 | 900 | 900 |
| Physical Property | Apparent Density [kg/m$^3$] | | 99 | 91 | 91 | 96 | 94 | 95 |
| | Tg [°C] | | −19.0 | 25.3 | −0.8 | 2.8 | 1.5 | 2.0 |
| | Molecular Weight between Crosslinking Points [×10$^4$] | | 4.7 | 4.5 | 2.4 | 5.2 | 4.8 | 15 |
| | Storage Modulus @ 0 °C [kPa] | | 1870 | 1650 | 1820 | 6580 | 7020 | 12900 |
| | Storage Modulus @ 23 °C [kPa] | | 28 | 426 | 57 | 85 | 90 | 69 |

TABLE 3-continued

| | Example No. | | | | | |
|---|---|---|---|---|---|---|
| | Example 1-7 | Example 1-8 | Example 1-9 | Example 1-10 | Example 1-11 | Example 1-12 |
| Storage Modulus Ratio (@ 0 °C/@ 23 °C) [—] | 0.015 | 0.26 | 0.031 | 0.013 | 0.013 | 0.0053 |
| Maximum Value of tanδ [—] | 0.9 | 1.1 | 1.2 | 1.1 | 1.1 | 1.8 |
| Half Width of tanδ Peak [C] | 23 | 16 | 20 | 14 | 15 | 11 |
| Strain at Tensile Fracture Point [%] | 81 | 85 | 353 | 92 | 98 | 340 |
| Determination of Ductility (≥70%) | Good | Good | Good | Good | Good | Good |
| Breaking Energy [mJ] | 57 | 498 | 1620 | 75 | 54 | 520 |
| Breaking Energy per Unit Weight [mJ/g] | 62 | 593 | 1929 | 85 | 62 | 593 |
| Determination of Strength (≥50 mJ/g) | Good | Good | Good | Good | Good | Good |
| Comprehensive Determination of Durability | Good | Good | Good | Good | Good | Good |
| Recovery Rate after 30 Minutes [%] | 99.5 | 90.9 | 100.0 | 99.3 | 98.7 | 87.0 |
| Recovery Rate after 24 Hours [%] | 99.8 | 100.0 | 100.0 | 100.0 | 100.0 | 95.0 |
| Compression Set after 24 hours [%] | 0.2 | 0.0 | 0.0 | 0.0 | 0.0 | 5.0 |

(T)*: Total amount of a vinyl-based monomer and a crosslinking agent (Blending amount of the crosslinking agent excluding impurities)

TABLE 4

| | | | Comparative Example No. | | | |
|---|---|---|---|---|---|---|
| | | | Comparative Example 1-1 | Comparative Example 1-2 | Comparative Example 1-3 | Comparative Example 1-4 |
| Organic Phase (Continuous Phase) | Monomer (Monofunctional) | St [parts by weight] | 31 | 19 | 30.6 | 48.5 |
| | | BA [parts by weight] | 47.5 | 56.5 | 57.5 | 30 |
| | Crosslinking Agent | DVB [parts by weight] | 4 | 12 | 11.9 | 4 |
| | | PEGDA [parts by weight] | 10 | 5 | — | 10 |
| | | EpDA [parts by weight] | — | — | — | — |
| | Emulsifier | PGPR [parts by weight] | 7.5 | 7.5 | 8 | 7.5 |
| | Polymerization Initiator | LPO [parts by weight] | 1 | 1 | 1 | 1 |
| | Blending amount of first crosslinking agent excluding impurities with respect to 100 parts by weight of (T)* | | 2.3 | 6.8 | 6.8 | 2.3 |
| | Blending amount of second crosslinking agent excluding impurities with respect to 100 parts by weight of (T)* | | 9.5 | 4.8 | 0.0 | 9.5 |
| | Blending amount of first crosslinking agent excluding impurities/ Blending amount of second crosslinking agent excluding impurities | | 0.24 | 1.4 | — | 0.24 |
| Aqueous Phase (Dispersed Phase) | | Water [parts by mass] | 330 | 900 | 1300 | 900 |
| Physical Property | Apparent Density [kg/m$^3$] | | 294 | 96 | 76 | 95 |
| | Tg [°C] | | 5.3 | 2.0 | −5.2 | 35.8 |
| | Molecular Weight between Crosslinking Points [×10$^4$] | | 3.1 | 0.4 | 0.5 | 4.7 |
| | Storage Modulus @ 0 °C [kPa] | | 15200 | 4010 | 1860 | 3220 |
| | Storage Modulus @ 23 °C [kPa] | | 190 | 220 | 905 | 3340 |
| | Storage Modulus Ratio (@ 0 °C/@ 23 °C) [—] | | 0.013 | 0.055 | 0.49 | 1.0 |
| | Maximum Value of tanδ [—] | | 1.1 | 0.4 | 0.3 | 1.2 |
| | Half Width of tanδ Peak [°C] | | 19 | 73 | 98 | 17 |
| | Strain at Tensile Fracture Point [%] | | 65 | 50 | 65 | 15 |
| | Determination of Ductility (≥70%) | | Poor | Poor | Poor | Poor |
| | Breaking Energy [mJ] | | 340 | 51 | 100 | 176 |
| | Breaking Energy per Unit Weight [mJ/g] | | 125 | 58 | 143 | 201 |
| | Determination of Strength (≥50 mJ/g) | | Good | Good | Good | Good |
| | Comprehensive Determination of Durability | | Poor | Poor | Poor | Poor |
| | Recovery Rate after 30 Minutes [%] | | 100.0 | 99.9 | 99.9 | 75.1 |
| | Recovery Rate after 24 Hours [%] | | 100.0 | 100.0 | 100.0 | 76.7 |
| | Compression Set after 24 hours [%] | | 0.0 | 0.0 | 0.0 | 23.3 |

(T) *: Total amount of a vinyl-based monomer and a crosslinking agent (Blending amount of the crosslinking agent excluding impurities)

As can be understood from Tables 2 to 4, the HIPE foams of Examples are flexible, excellent in ductility, and also excellent in strength. Of the HIPE foams of these Examples, the HIPE foams of Examples 1-1 to 1-11 are excellent in recoverability as well.

Comparative Example 1-1 was an example of which the apparent density was large, and the ductility was insufficient.

Comparative Examples 1-2 and 1-3 are examples of which the molecular weight between crosslinking points was small, and the ductility was insufficient.

Comparative Example 1-4 is an example of which the storage modulus was high, and the ductility was insufficient.

Next, examples (Examples 2-1 to 2-8 and Comparative Examples 2-1 to 2-5) of a HIPE foam configured to be usable as a sound-absorbing material will be described.

Example 2-1

First, in a glass container having an internal volume of 3 L and provided with a stirring device with a torque converter, 14.5 g of styrene and 66 g of butyl acrylate as vinyl-based monomers, 7 g of divinylbenzene having a purity of 57 wt % (4.0 g as divinylbenzene) as a hard crosslinking agent (hereinafter, referred to as a first crosslinking agent), 5 g of polyethylene glycol diacrylate (specifically, NK ESTER A-400 manufactured by SHIN-NAKAMURA CHEMICAL Co., Ltd., 4.8 g as polyethylene glycol diacrylate) as a soft crosslinking agent (hereinafter, referred to as a second crosslinking agent), 7.5 g of polyglycerin-condensed ricinolate (specifically, CRS-75 manufactured by Sakamoto Yakuhin Kogyo Co., Ltd.) as an emulsifier, and 0.5 g of dilauroyl peroxide and 0.5 g of bis(4-t-butylcyclohexyl)peroxydicarbonate as polymerization initiators were added. These were mixed in the glass container to form an organic phase.

While the organic phase was stirred at a stirring power density of 0.03 kW/$m^3$, 2090 g of deionized water was added at a rate of about 450 g/min (addition rate of about 450 wt %/min with respect to 100 wt % of organic phase), and stirring was continued for 10 minutes even after the end of the addition of the deionized water to thereby prepare a water-in-oil type (that is, W/O type) high internal phase emulsion.

Then, the stirring power density was reduced to 0.03 kW/$m^3$, an aspirator was connected to the glass container, and the inside of the container was depressurized to remove microbubbles contained in the emulsion. After 10 minutes from the start of the depressurization, stirring was stopped, and the inside of the container was returned to atmospheric pressure.

The contents of the glass container were filled into a container having a length of about 250 mm, a width of about 180 mm, and a depth of about 90 mm, and polymerized in a hot water bath at 70° C. for about 10 hours to thereby obtain a HIPE foam containing water. The HIPE foam was removed from the hot water bath and cooled to room temperature.

After cooling, the HIPE foam was removed from the container, washed with water, dehydrated, and dried in an oven at 85° C. until constant weight. A rectangular parallelepiped HIPE foam composed of a vinyl-based crosslinked polymer was thus obtained. The density of the HIPE foam was 50 kg/$m^3$.

The charge composition and the like of this example are shown in Table 5. The contents of the various components (the vinyl-based monomer and the crosslinking agent) in the crosslinked polymer can be determined from the blending amounts (for the crosslinking agent, the blending amount excluding impurities) of the various components at the time of charging and the total blending amounts of the vinyl-based monomer component and the crosslinking agent component (excluding impurities).

In the table, the compound names are abbreviated as follows.

St: styrene

BA: butyl acrylate

2-EHA: 2-ethylhexyl acrylate

DVB: divinylbenzene

PEGDA: polyethylene glycol diacrylate

PPGDA: polypropylene glycol diacrylate ("APG-400" manufactured by SHIN-NAKAMURA CHEMICAL Co., Ltd.)

EpDA: epoxy diacrylate (specifically, a both-end acrylic-modified epoxy prepolymer, "EBECRYL (registered trademark) 3708" manufactured by Daicel-Allnex Ltd.)

LPO: dilauroyl peroxide

LTCP: bis(4-t-butylcyclohexyl)peroxydicarbonate

Examples 2-2 to 2-8 and Comparative Examples 2-1 to 2-5

A sound-absorbing material made of a HIPE foam was produced in the same manner as in Example 2-1 except that the charge composition was modified as shown in Tables 5 and 6.

As a modification other than the charge composition, in Examples 2-3 and 2-5 and Comparative Examples 2-2 and 2-5, the stirring power density in the emulsification step was changed to 4.4 kW/$m^3$. In Examples 2-6 and 2-7, the stirring power density in the emulsification step was changed to 0.2 kW/$m^3$. In Example 2-8, the stirring power density in the emulsification step was changed to 0.6 kW/$m^3$.In Comparative Examples 2-1 and 2-3, the stirring power density in the emulsification step was changed to 7.8 kW/$m^3$. In Comparative Example 2-4, the stirring power density in the emulsification step was changed to 0.02 kW/$m^3$.

[Evaluation]

The following measurement and evaluation were performed for Examples 2-1 to 2-8 and Comparative Examples 2-1 to 2-5. The results are shown in Tables 5 and 6. Of the evaluation items shown in Table 5, the glass transition temperature Tg, the molecular weight between crosslinking points, and the storage modulus at 23° C. were measured and evaluated by the same method as described above. Similarly, of the evaluation items shown in Table 6, the glass transition temperature Tg and the molecular weight between crosslinking points were measured and evaluated by the same method as described above. For Comparative Examples shown in Table 6, the storage modulus at 23° C. was not measured.

(Average Diameter of Cells)

The average diameter of the cells was measured as follows. With a feather blade, samples for observation were cut out from the center in both of the short direction and the thickness direction, and the centers in the thickness direction at both ends in the short direction of a HIPE foam having a rectangular parallelepiped shape respectively. Then, the samples were observed with a low vacuum scanning electron microscope (Miniscope (registered trademark) TM3030Plus manufactured by Hitachi High-Tech Science Corporation), and a sectional photograph was taken. An example of the sectional photograph of the HIPE foam is shown in FIG. 1. Detailed observation conditions were as follows.

Pretreatment of sample: Conductive treatment of the sample was performed using a metal coating apparatus (MSP-1S of Vacuum Device Co., Ltd.). Au—Pd was used as a target electrode.

Observation magnification: 50 times

Acceleration voltage: 5 kV

Observation conditions: Surface (low magnification)

Observation mode: Secondary electron (standard)

Next, the taken sectional photograph was analyzed with image processing software (NanoHunter NS2K-Pro manufactured by Nanosystem Corporation), and a measurement region was set on the sectional photograph of each sample in such a manner that a total area was 5 $mm^2$ or more. Next, the cell diameters of the cells present in the measurement region were calculated, and the arithmetic average value thereof was taken as the cell diameter of each sample. The average diameter of the cells in the HIPE foam were determined by arithmetically averaging the obtained cell diameters of the three samples. Detailed analysis procedures and conditions were as follows.

(1) Monochrome conversion
(2) Smoothing filter (3×3, near 8, number of times of processing=1)
(3) Density unevenness correction (brighter than background, size=5)
(4) NS method binarization (darker than background, sharpness=9, sensitivity=1, noise removal, density range=0 to 255)
(5) Shrinkage (near 8, number of times of processing=1)
(6) Selection of image by feature amount (area) (only 50 to $\infty \mu m^2$ was selected, near 8)
(7) Expansion not connected with neighbor (near 8, number of times of processing=3)
(8) Equivalent circle diameter measurement (calculated from area, near 8)

(Average Diameter of Through Hole)

A sectional photograph of the HIPE foam was taken in the same procedure as the method for calculating the average diameter of the cells except that the observation magnification was changed to 500 times and the observation mode was changed to the reflected electron method (standard). Next, the taken sectional photograph was analyzed with image processing software (WinROOF2013 manufactured by MITANI CORPORATION), and the measurement region was set on the sectional photograph of each sample in such a manner that the total area was 1 $mm^2$ or more. Next, the through hole diameters of the through holes present in the measurement region were calculated, and the arithmetic average value thereof was taken as the through hole diameter of each sample. The average diameter of the through holes in the HIPE foam were determined by arithmetically averaging the obtained through hole diameters of the three samples. Detailed analysis procedures and conditions were as follows.

(1) Monochrome imaging
(2) Averaging filter (filter size=3×3, number of times=1)
(3) Automatic binarization (discriminant analysis method, extraction region=dark region, target density range=0 to 255)
(4) Modulation of morphology (expansion, number of times=3)
(5) Measurement from shape features (measurement item=circle equivalent diameter, number)

(Peak Temperature and Maximum Value of tan δ and Half Width of tan δ Peak)

A T-tan δ curve in a temperature range of −100 to 120° C. was obtained in the same manner as in the measurement of the molecular weight Mc between crosslinking points. The value of tan δ tan δ at the peak top in the obtained T-tan δ curve was defined as the maximum value of the loss tangent tan δ, and the temperature at which tan δ showed the maximum value was defined as the peak temperature of tan δ. In the tan δ peak appearing in the T-tan δ curve, two temperatures at which the value of tan δ was ½ of the maximum value were determined, and the temperature difference therebetween was defined as a half width H.

(Flow Resistance per Unit Thickness)

The flow resistance per unit thickness of the HIPE foam was measured in accordance with ISO 9053-1:2018. Specifically, a test piece having a disk shape with a diameter of 40 mm and a thickness of 20 mm was cut out from the vicinity of the center of the HIPE foam without including the skin surface. This test piece was attached to a sample holder of a measurement apparatus (flow resistance measurement system "AirReSys" manufactured by Nippon Onkyo Engineering Co., Ltd.), and air having a flow rate of 1 to 3 mm/s was caused to flow from one end surface of the test piece toward the other end surface. A differential pressure at a flow rate of 0.5 mm/s was obtained from the relationship between each flow rate and a difference between the pressure at one end surface and the pressure at the other end surface of the test piece (that is, a differential pressure) measured at this time. Then, the flow resistance per unit thickness (unit: $N\cdot s/m^4$) was calculated based on the differential pressure at a flow rate of 0.5 mm/s and the shape of the test piece. The results are shown in Tables 5 and 6.

(Sound Absorbency)

The sound absorbency was evaluated based on the normal incidence sound absorption coefficient of the HIPE foam at 23° C. at each frequency measured in accordance with JIS A 1405-2. Specifically, a test piece having a disk shape with a thickness of 20 mm and a diameter of 40 mm was cut out from the vicinity of the center of the HIPE foam without including the skin surface. This test piece was placed in a sample holder of a measurement apparatus (normal incidence sound absorption coefficient measurement system "WinZacMTX" manufactured by Nippon Onkyo Engineering Co., Ltd.), and measurement was performed under the following conditions.

FFT Analysis Conditions

Sampling frequency: 32,000 Hz

Number of FFT points: 8192 points

Output signal: Random signal (both in measurement and calibration)

Window function: Hanning (both in measurement and calibration)

Overlap: 75% (both in measurement and calibration)

Average number of times in measurement: 400 times

Average number of times in calibration: 800 times

Measurement Conditions

Measurement type: Sound absorption coefficient/Reflectance (reflection method)

Microphone type: Two-microphone method

Distance between sample surface and MicA: 80 mm

Distance between microphones: 30 mm

Sample diameter: 40 mm

Sample thickness: 20 mm

Length of rear air layer: 0 mm

Temperature: 23° C.

The normal incidence sound absorption coefficients of the HIPE foam at frequencies of 125 Hz, 200 Hz, 300 Hz, 400 Hz, 500 Hz, 600 Hz, 700 Hz, 800 Hz, 900 Hz, 1000 Hz, 1500 Hz, 2000 Hz, 2500 Hz, 3000 Hz, 3500 Hz, 4000 Hz, 4500 Hz, and 5000 Hz were thus measured.

The total value of the normal incidence sound absorption coefficients at respective frequencies measured by the above method is described as a total of the normal incidence sound absorption coefficients at the frequency of 125 to 5000 Hz in the column of "All frequencies" in Tables 5 and 6. Of the normal incidence sound absorption coefficients at the respective frequencies measured by the above method, a value obtained by summing the normal incidence sound absorption coefficients at the frequency of 500 to 1000 Hz is described as a sum of the normal incidence sound absorption coefficients at the frequency of 500 to 1000 Hz in the column of "500 to 1000 Hz" in Tables 5 and 6.

TABLE 5

| | | | Example 2-1 | Example 2-2 | Example 2-3 | Example 2-4 | Example 2-5 | Example 2-6 | Example 2-7 | Example 2-8 |
|---|---|---|---|---|---|---|---|---|---|---|
| Organic Phase (Continuous Phase) | Monomer (Monofunctional) | St [parts by weight] | 14.5 | 15.5 | 15 | 15.5 | — | 37.5 | 14 | 3 |
| | | BA [parts by weight] | 66 | 70 | 68 | 70 | — | 48 | 63.5 | 56.5 |
| | | 2-EHA [parts by weight] | — | — | — | — | 80.5 | — | — | — |
| | Crosslinking Agent | DVB [parts by weight] | 7 | 7 | 7 | 7 | 12 | 7 | 10 | 3 |
| | | PEGDA [parts by weight] | 5 | — | — | — | — | — | — | — |
| | | PPGDA [parts by weight] | — | — | — | — | — | — | 5 | — |
| | | EpDA [parts by weight] | — | — | — | — | — | — | — | 30 |
| | Emulsifier | CRS-75 [parts by weight] | 7.5 | 7.5 | 10 | 7.5 | 7.5 | 7.5 | 7.5 | 7.5 |
| | Polymerization Initiator | LPO [parts by weight] | 0.5 | 0.5 | 0.5 | 1 | 0.5 | 0.5 | 0.5 | 1 |
| | | LTCP [parts by weight] | 0.5 | 0.5 | 0.5 | — | 0.5 | 0.5 | 0.5 | — |
| Aqueous Phase (Dispersed Phase) | | Water [parts by mass] | 1900 | 567 | 1900 | 1900 | 1900 | 1900 | 1900 | 1900 |
| Physical Property | Apparent Density [kg/m$^3$] | | 50 | 165 | 55 | 50 | 54 | 51 | 49 | 52 |
| | Average Diameter of Cell [μm] | | 98 | 139 | 34 | 114 | 27 | 74 | 73 | 59 |
| | Average Diameter of Through Hole [μm] | | 13 | 11 | 8 | 18 | 7 | 12 | 11 | 17 |
| | Average Diameter of Through Hole/ Average Diameter of Cell | | 0.13 | 0.08 | 0.24 | 0.16 | 0.26 | 0.16 | 0.15 | 0.29 |
| | Tg [°C] | | −20 | −18 | −24 | −25 | −54 | 25 | −11 | −20 |
| | Molecular Weight between Crosslinking Points [×10$^4$] | | 3.9 | 8.0 | 12.1 | 8.0 | 1.8 | 6.7 | 4.1 | 19.3 |
| | Storage Modulus @ 23 °C [kPa] | | 20 | 523 | 12 | 12 | 22 | 483 | 30 | 6 |
| | Peak temperature of tanδ [°C] | | 4 | 12 | 10 | 12 | -28 | 39 | 13 | 0 |
| | Maximum Value of tanδ [—] | | 0.76 | 0.80 | 0.78 | 0.80 | 0.40 | 0.99 | 0.52 | 0.98 |
| | Half Width of tanδ Peak [°C] | | 33 | 30 | 32 | 30 | 73 | 24 | 38 | 21 |
| | Flow resistance per unit thickness [N · s/m$^4$] | | $1.7 \times 10^5$ | $3.8 \times 10^5$ | $5.5 \times 10^5$ | $8.5 \times 10^4$ | $5.8 \times 10^5$ | $2.5 \times 10^5$ | $2.4 \times 10^5$ | $2.6 \times 10^5$ |
| | Sound Absorbency | All Frequencies [—] | 9.36 | 8.68 | 9.18 | 10.41 | 8.98 | 9.58 | 9.64 | 10.16 |
| | | 500~1000 Hz [—] | 3.2 | 3.2 | 3.9 | 2.8 | 3.6 | 2.8 | 3.5 | 4.2 |

TABLE 6

| | | | Comparative Example 2-1 | Comparative Example 2-2 | Comparative Example 2-3 | Comparative Example 2-4 | Comparative Example 2-5 |
|---|---|---|---|---|---|---|---|
| Organic Phase (Continuous Phase) | Monomer (Monofunctional) | St [parts by weight] | 15.5 | 13 | 14 | 18 | 51.5 |
| | | BA [parts by weight] | 70 | 57 | 64 | 70 | 34 |
| | | 2-EHA [parts by weight] | — | — | — | — | — |
| | Crosslinking Agent | DVB [parts by weight] | 7 | 20 | 7 | 7 | 7 |
| | | PEGDA [parts by weight] | — | — | — | — | — |
| | | PPGDA [parts by weight] | — | — | — | — | — |
| | | EpDA [parts by weight] | — | — | — | — | — |
| | Emulsifier | CRS-75 [parts by weight] | — | 10 | 15 | 5 | 7.5 |
| | Polymerization Initiator | LPO [parts by weight] | 0.5 | 0.5 | 0.5 | 0.5 | 0.5 |
| | | LTCP [parts by weight] | 0.5 | 0.5 | 0.5 | 1 | 0.5 |
| Aqueous Phase (Dispersed Phase) | | Water [parts by mass] | 233 | 9900 | 900 | 1900 | 1900 |
| Physical Property | Apparent Density [kg/m$^3$] | | 220 | 8 | 102 | 53 | 55 |
| | Average Diameter of Cell [μm] | | 15 | 76 | 20 | 180 | 41 |
| | Average Diameter of Through Hole [μm] | | 5 | 13 | 4 | 19 | 7 |
| | Average Diameter of Through Hole/ Average Diameter of Cell | | 0.33 | 0.17 | 0.20 | 0.11 | 0.17 |
| | Tg [°C] | | −18 | — | −28 | −14 | 50 |
| | Molecular Weight between Crosslinking Points [×10$^4$] | | 14.7 | — | 5.0 | 9.7 | 3.0 |
| | Peak temperature of tanδ [°C] | | 4 | 61 | 15 | 10 | 70 |
| | Maximum Value of tanδ [—] | | 0.83 | 0.21 | 0.67 | 0.84 | 0.87 |
| | Half Width of tand Peak [°C] | | 30 | 140 | 33 | 34 | 22 |
| | Flow resistance per unit thickness [N · s/m$^4$] | | $1.1 \times 10^7$ | $3.0 \times 10^4$ | $2.0 \times 10^6$ | $6.0 \times 10^4$ | $6.9 \times 10^5$ |
| | Sound Absorbency | All Frequencies [—] | 3.95 | 9.52 | 6.42 | 9.87 | 6.50 |
| | | 500~1000 Hz [—] | 1.5 | 1.8 | 2.7 | 2.1 | 1.7 |

5 As shown in Table 5, in the HIPE foams of Examples 2-1 to 2-8, a crosslinked polymer obtained by crosslinking a polymer of an acrylic monomer and/or a styrene-based monomer is used as a base resin, and the peak temperature of tan δ and the flow resistance per unit thickness are each within the above-described specific range. Thus, the sound-absorbing materials made of these HIPE foams have improved sound absorbency in a low frequency region and have excellent sound absorbency in a wide frequency region.

On the other hand, as shown in Table 6, the flow resistance per unit thickness of the HIPE foam of Comparative Example 2-1 is too high. Thus, the sound-absorbing material made of the HIPE foam of Comparative Example 2-1 is inferior in sound absorbency in all frequency regions to the sound-absorbing materials made of the HIPE foams of Examples 2-1 to 2-8.

In the HIPE foam of Comparative Example 2-2, the tan δ peak temperature is higher than the specific range and the flow resistance per unit thickness is too low. Thus, the sound-absorbing material made of the HIPE foam of Comparative Example 2-2 is inferior in sound absorbency in a relatively low frequency region to the sound-absorbing materials of Examples 2-1 to 2-8.

The HIPE foam of Comparative Example 2-3 has a lower flow resistance per unit thickness as compared with Comparative Example 2-1, but has a higher flow resistance than the specific range. Thus, the sound-absorbing material made of the HIPE foam of Comparative Example 2-3 is inferior in sound absorbency in all frequency regions to the sound-absorbing materials of Examples 2-1 to 2-8.

The flow resistance per unit thickness of the HIPE foam of Comparative Example 2-4 is too low. Thus, the sound-absorbing material made of the HIPE foam of Comparative Example 2-4 is inferior in sound absorbency in a relatively low frequency region to the sound-absorbing materials of Examples 2-1 to 2-8.

The tan δ peak temperature of the HIPE foam of Comparative Example 2-5 is too high. Thus, the sound-absorbing material made of the HIPE foam of Comparative Example 2-5 is inferior in sound absorbency in a relatively low frequency region to the sound-absorbing materials of Examples 2-1 to 2-8.

Although the specific aspects of the porous body and the sound-absorbing material according to the present invention have been described above based on Examples, the specific aspects of the porous body according to the present invention are not limited to the aspects shown in Examples, and the configuration can be appropriately changed without impairing the gist of the present invention.

The invention claimed is:

1. A porous body comprising, as a base resin, a crosslinked polymer obtained by crosslinking a polymer of an acrylic monomer and/or a styrene-based monomer, wherein a storage modulus of the porous body is 5 kPa or more and 2000 kPa or less at 23° C., an apparent density of the porous body is 10 kg/m$^3$ or more and 250 kg/m$^3$ or less, and a molecular weight between crosslinking points of the crosslinked polymer is $1.0\times10^4$ or more.

2. The porous body according to claim 1, wherein a glass transition temperature of the crosslinked polymer is −30° C. or higher, and the molecular weight between crosslinking points of the crosslinked polymer is $1.0\times10^4$ or more and $12\times10^4$ or less.

3. The porous body according to claim 1, wherein a maximum value of a loss tangent tan δ in a temperature-loss tangent tan δ curve measured by performing dynamic viscoelasticity measurement on the porous body under conditions of frequency: 1 Hz, load: 10 mN, and deformation mode: compression is 0.8 or more and 1.6 or less.

4. The porous body according to claim 1, wherein a half width of a tan δ peak showing a maximum value of a loss tangent tan δ in a temperature-loss tangent tan δ curve measured by performing dynamic viscoelasticity measurement on the porous body under conditions of frequency: 1 Hz, load: 10 mN, and deformation mode: compression is 10° C. or more and 25° C. or less.

5. The porous body according to claim 1, wherein the crosslinked polymer is obtained by crosslinking a copolymer of the acrylic monomer and the styrene-based monomer, and the acrylic monomer is an ester of (meth)acrylic acid and an alcohol having 1 to 20 carbon atoms.

6. The porous body according to claim 1, wherein the crosslinked polymer is obtained by crosslinking a polymer of the acrylic monomer and/or the styrene-based monomer with a first crosslinking agent having a functional group equivalent of 130 g/eq or less and a second crosslinking agent having a functional group equivalent of more than 130 g/eq and 5000 g/eq or less, and the functional group equivalent of the second crosslinking agent is larger than the functional group equivalent of the first crosslinking agent by 100 g/eq or more.

7. The porous body according to claim 1, wherein the crosslinked polymer is obtained by crosslinking a polymer of the acrylic monomer and/or the styrene-based monomer with a crosslinking agent having a functional group equivalent of 500 g/eq or more and 3000 g/eq or less, and the crosslinking agent is urethane (meth)acrylate and/or epoxy (meth)acrylate.

8. The porous body according to claim 1, wherein a recovery rate of the porous body after 25% compression at 23° C. is 90% or more.

9. The porous body according to claim 1, wherein a tensile elongation at break of the porous body is 70% or more at 23° C.

10. The porous body according to claim 1, wherein a breaking energy per unit weight of the porous body is 50 mJ/g or more.

11. A sound-absorbing material comprising the porous body according to claim 1, wherein a peak temperature of a loss tangent tan δ in a temperature-loss tangent tan δ curve measured by performing dynamic viscoelasticity measurement on the porous body under conditions of frequency: 1 Hz, load: 10 mN, and deformation mode: compression is 50° C. or lower, and a flow resistance per unit thickness of the porous body at a flow rate of 0.5 mm/s is $7\times10^4$ N·s/m$^4$ or more and $1\times10^6$ N·s/m$^4$ or less when measured in accordance with ISO 9053-1:2018.

* * * * *